United States Patent
Papasakellariou

(10) Patent No.: US 11,570,795 B2
(45) Date of Patent: *Jan. 31, 2023

(54) CONTROL SIGNALING DESIGN FOR IMPROVED RESOURCE UTILIZATION

(71) Applicant: Samsung Electronics Co., Ltd., Suwon-si (KR)

(72) Inventor: Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/651,045

(22) Filed: Feb. 14, 2022

(65) Prior Publication Data

US 2022/0167375 A1 May 26, 2022

Related U.S. Application Data

(63) Continuation of application No. 16/946,995, filed on Jul. 14, 2020, now Pat. No. 11,304,218.

(Continued)

(51) Int. Cl.
*H04W 72/12* (2009.01)
*H04W 72/04* (2009.01)
*G06F 7/499* (2006.01)

(52) U.S. Cl.
CPC .... *H04W 72/1257* (2013.01); *G06F 7/49973* (2013.01); *H04W 72/042* (2013.01);
(Continued)

(58) Field of Classification Search
None
See application file for complete search history.

(56) References Cited

U.S. PATENT DOCUMENTS

| | | |
|---|---|---|
| 2013/0155868 A1 | 6/2013 | Seo et al. |
| 2013/0188558 A1 | 7/2013 | Nam et al. |

(Continued)

OTHER PUBLICATIONS

International Search Report and Written Opinion of the International Searching Authority in connection with International Application No. PCT/KR2020/009816 dated Oct. 26, 2020, 10 pages.

(Continued)

*Primary Examiner* — Kodzovi Acolatse

(57) ABSTRACT

Methods and apparatuses for PDCCH reception and transmission. A method for PDCCH reception includes transmitting a capability for receptions of PDCCHs on a downlink (DL) cell. PDCCH receptions on the DL cell are according to $(X_1, Y_1)$ or $(X_2, Y_2)$ when any two PDCCH receptions are within $Y_1$ or $Y_2$ symbols or have first symbols separated by at least $X_1$ or $X_2$ symbols, respectively. The method further includes receiving a configuration of search space sets for PDCCH receptions on the DL cell; determining, based on the configuration of the search space sets, whether PDCCH receptions are according to $(X_2, Y_2)$; and receiving on the DL cell: a maximum number of $M_{PDCCH}^{max,X_1,\mu}$ PDCCHs within $Y_1$ symbols when PDCCH receptions are not according to $(X_2, Y_2)$, and a maximum number of $M_{PDCCH}^{max,X_2,\mu}$ PDCCHs within $Y_2$ symbols when PDCCH receptions are according to $(X_2, Y_2)$.

20 Claims, 9 Drawing Sheets

Related U.S. Application Data

(60) Provisional application No. 62/964,750, filed on Jan. 23, 2020, provisional application No. 62/877,956, filed on Jul. 24, 2019.

(52) U.S. Cl.
CPC ... *H04W 72/0413* (2013.01); *H04W 72/0453* (2013.01); *H04W 72/0493* (2013.01); *H04W 72/1226* (2013.01)

(56) References Cited

U.S. PATENT DOCUMENTS

| | | | |
|---|---|---|---|
| 2019/0181929 A1* | 6/2019 | Ge | H04B 7/0632 |
| 2020/0037245 A1* | 1/2020 | Lu | H04L 5/0078 |
| 2020/0154295 A1* | 5/2020 | Lin | H04W 52/0216 |
| 2020/0169991 A1* | 5/2020 | Lin | H04W 72/10 |
| 2020/0305134 A1* | 9/2020 | Noh | H04L 5/0053 |
| 2020/0314678 A1* | 10/2020 | Lee | H04W 28/0268 |
| 2020/0314811 A1* | 10/2020 | Lin | H04L 5/0053 |
| 2020/0322929 A1* | 10/2020 | Bagheri | H04L 5/0094 |
| 2020/0351681 A1* | 11/2020 | Salah | H04L 5/0007 |
| 2021/0022122 A1* | 1/2021 | Khoshnevisan | H04L 5/0053 |
| 2021/0028961 A1* | 1/2021 | Lee | H04W 24/08 |
| 2021/0227514 A1* | 7/2021 | Takeda | H04L 5/001 |
| 2021/0320821 A1* | 10/2021 | Lee | H04L 5/0053 |

OTHER PUBLICATIONS

Huawei, "Summary of Monday offline discussion on PDCCH enhancements," R1-1907763, 3GPP TSG RAN WG1 Meeting #97, Reno, USA, May 13-17, 2019, 60 pages.

Ericsson, "Improving PDCCH Monitoring Capability on a Monitoring Span," R1-1906104, 3GPP TSG RAN WG1 Meeting #97, Reno, Nevada, USA, May 13-17, 2019, 3 pages.

3GPP TS 38.213 V15.6.0 (Jun. 2019), Technical Specification, 3rd Generation Partnership Project, Technical Specification Group Radio Access Network, NR, Physical layer procedure for control, (Release 15) Jun. 24, 2019, 107 pages.

5G; NR; Physical channels and modulation (3GPP TS 38.211 version 15.6.0 Release 15), ETSI TS 138 211 V15.6.0, Jul. 2019, 100 pages.

5G; NR; Multiplexing and channel coding (3GPP TS 38.212 version 15.6.0 Release 15), ETSI TS 138 212 V15.6.0, Jul. 2019, 106 pages.

5G; NR; Physical layer procedures for control (3GPP TS 38.213 version 15.6.0 Release 15), ETSI TS 138 213 V15.6.0, Jul. 2019, 110 pages.

5G; NR; Physical layer procedures for data (3GPP TS 38.214 version 15.6.0 Release 15), ETSI TS 138 214 V15.6.0, Jul. 2019, 108 pages.

5G; NR; Medium Access Control (MAC) protocol specification (3GPP TS 38.321 version 15.6.0 Release 15), ETSI TS 138 321 V15.6.0, Jul. 2019, 80 pages.

5G; NR; Radio Resource Control (RRC); Protocol specification (3GPP TS 38.331 version 15.6.0 Release 15), ETSI TS 138 331 V15.6.0, Jul. 2019, 516 pages.

Extended European Search Report dated Sep. 6, 2022 regarding Application No. 20844469.5, 9 pages.

Panasonic, "PDCCH enhancements for NR URLLC", 3GPP TSG RAN WG1 #97, R1-1906865, May 2019, 6 pages.

Nokia et al., "On cross-carrier scheduling with mixed numerologies", 3GPP TSG RAN WG1 Meeting #96, R1-1902427, Feb. 2019, 11 pages.

\* cited by examiner

CONTROL SIGNALING DESIGN FOR IMPROVED RESOURCE UTILIZATION

CROSS-REFERENCE TO RELATED APPLICATIONS AND CLAIM OF PRIORITY

This application is a continuation of U.S. patent application Ser. No. 16/946,995, filed on Jul. 14, 2020, which claims priority to U.S. Provisional Patent Application No. 62/877,956, filed on Jul. 24, 2019, and U.S. Provisional Patent Application No. 62/964,750, filed on Jan. 23, 2020. The content of the above-identified patent document is incorporated herein by reference.

TECHNICAL FIELD

The present disclosure relates generally to wireless communication systems and, more specifically, to enhancing resource efficiency for communication between a base station and user equipments (UEs).

BACKGROUND

5th generation (5G) or new radio (NR) mobile communications, initial commercialization of which is expected around 2020, is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beam-forming gain and support increased capacity, new waveform (e.g., a new radio access technology (RAT)) to flexibly accommodate various services/applications with different requirements, new multiple access schemes to support massive connections, and so on.

SUMMARY

Various embodiments of the present disclosure provide control signaling design for improved resource utilization control.

In one embodiment, a user equipment (UE) is provided. The UE includes a transceiver configured to transmit a capability for receptions of physical downlink control channels (PDCCHs) on a downlink (DL) cell according to a first pair of $(X_1, Y_1)$ symbols and a second pair of $(X_2, Y_2)$ symbols. PDCCH receptions on the DL cell are according to $(X_1, Y_1)$ or $(X_2, Y_2)$ when any two PDCCH receptions are within $Y_1$ or $Y_2$ symbols or have first symbols separated by at least $X_1$ or $X_2$ symbols, respectively. $Y_1 < X_1$, $Y_2 < X_2$, and $X_1 < X_2$. A first maximum number $M_{PDCCH}^{max,X_1,\mu}$ of PDCCH receptions within $Y_1$ symbols according to $(X_1, Y_1)$ is smaller than a second maximum number $M_{PDCCH}^{max,X_2,\mu}$ of PDCCH receptions within $Y_2$ according to $(X_2, Y_2)$. The transceiver is further configured to receive a configuration of search space sets for PDCCH receptions on the DL cell. The UE also includes a processor operably connected to the transceiver. The processor is configured to determine based on the configuration of the search space sets whether PDCCH receptions are according to $(X_2, Y_2)$. The transceiver is further configured to receive on the DL cell: a maximum number of $M_{PDCCH}^{max,X_1,\mu}$ PDCCHs within $Y_1$ symbols when PDCCH receptions are not according to $(X_2, Y_2)$, and a maximum number of $M_{PDCCH}^{max,X_2,\mu}$ PDCCHs within $Y_2$ symbols when PDCCH receptions are according to $(X_2, Y_2)$.

In another embodiment, a base station is provided. The base station includes a transceiver configured to receive a capability for transmissions of PDCCHs on a DL cell according to a first pair of $(X_1, Y_1)$ symbols and a second pair of $(X_2, Y_2)$ symbols. PDCCH transmission on the DL cell are according to $(X_1, Y_1)$ or $(X_2, Y_2)$ when any two PDCCH transmission are within $Y_1$ or $Y_2$ symbols or have first symbols separated by at least $X_1$ or $X_2$ symbols, respectively. $Y_1 < X_1$, $Y_2 < X_2$, and $X_1 < X_2$. A first maximum number $M_{PDCCH}^{max,X_1,\mu}$ of PDCCH transmissions within $Y_1$ symbols according to $(X_1, Y_1)$ is smaller than a second maximum number $M_{PDCCH}^{max,X_2,\mu}$ of PDCCH transmissions within $Y_2$ according to $(X_2, Y_2)$. The transceiver is further configured to transmit a configuration of search space sets for PDCCH transmissions on the DL cell. The base station further includes a processor operably connected to the transceiver. The processor is configured to determine based on the configuration of the search space sets whether PDCCH transmissions are according to $(X_2, Y_2)$. The transceiver is further configured to transmit on the DL cell: a maximum number of $M_{PDCCH}^{max,X_1,\mu}$ PDCCHs within $Y_1$ symbols when PDCCH transmissions are not according to $(X_2, Y_2)$, and a maximum number of $M_{PDCCH}^{max,X_2,\mu}$ PDCCHs within $Y_2$ symbols when PDCCH transmissions are according to $(X_2, Y_2)$.

In yet another embodiment, a method for receiving PDCCHs is provided. The method includes transmitting a capability for receptions of PDCCHs on a DL cell according to a first pair of $(X_1, Y_1)$ symbols and a second pair of $(X_2, Y_2)$ symbols. PDCCH receptions on the DL cell are according to $(X_1, Y_1)$ or $(X_2, Y_2)$ when any two PDCCH receptions are within $Y_1$ or $Y_2$ symbols or have first symbols separated by at least $X_1$ or $X_2$ symbols, respectively. $Y_1 < X_1$, $Y_2 < X_2$, and $X_1 < X_2$. A first maximum number $M_{PDCCH}^{max,X_1,\mu}$ of PDCCH receptions within $Y_1$ symbols according to $(X_1, Y_1)$ is smaller than a second maximum number $M_{PDCCH}^{max,X_2,\mu}$ of PDCCH receptions within $Y_2$ according to $(X_2, Y_2)$. The method further includes receiving a configuration of search space sets for PDCCH receptions on the DL cell; determining, based on the configuration of the search space sets, whether PDCCH receptions are according to $(X_2, Y_2)$; and receiving on the DL cell: a maximum number of $M_{PDCCH}^{max,X_1,\mu}$ PDCCHs within $Y_1$ symbols when PDCCH receptions are not PDCCH according to $(X_2, Y_2)$, and a maximum number of $M_{PDCCH}^{max,X_2,\mu}$ PDCCHs within $Y_2$ symbols when PDCCH receptions are according to $(X_2, Y_2)$.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v15.6.0, "NR; Physical channels and modulation;" 3GPP TS 38.212 v15.6.0, "NR; Multiplexing and Channel coding;" 3GPP TS 38.213 v15.6.0, "NR; Physical Layer Procedures for Control;" 3GPP TS 38.214 v15.6.0, "NR; Physical Layer Procedures for Data;" 3GPP TS 38.321 v15.6.0, "NR; Medium Access Control (MAC) protocol specification;" and 3GPP TS 38.331 v15.6.0, "NR; Radio Resource Control (RRC) Protocol Specification."

Figure 1:
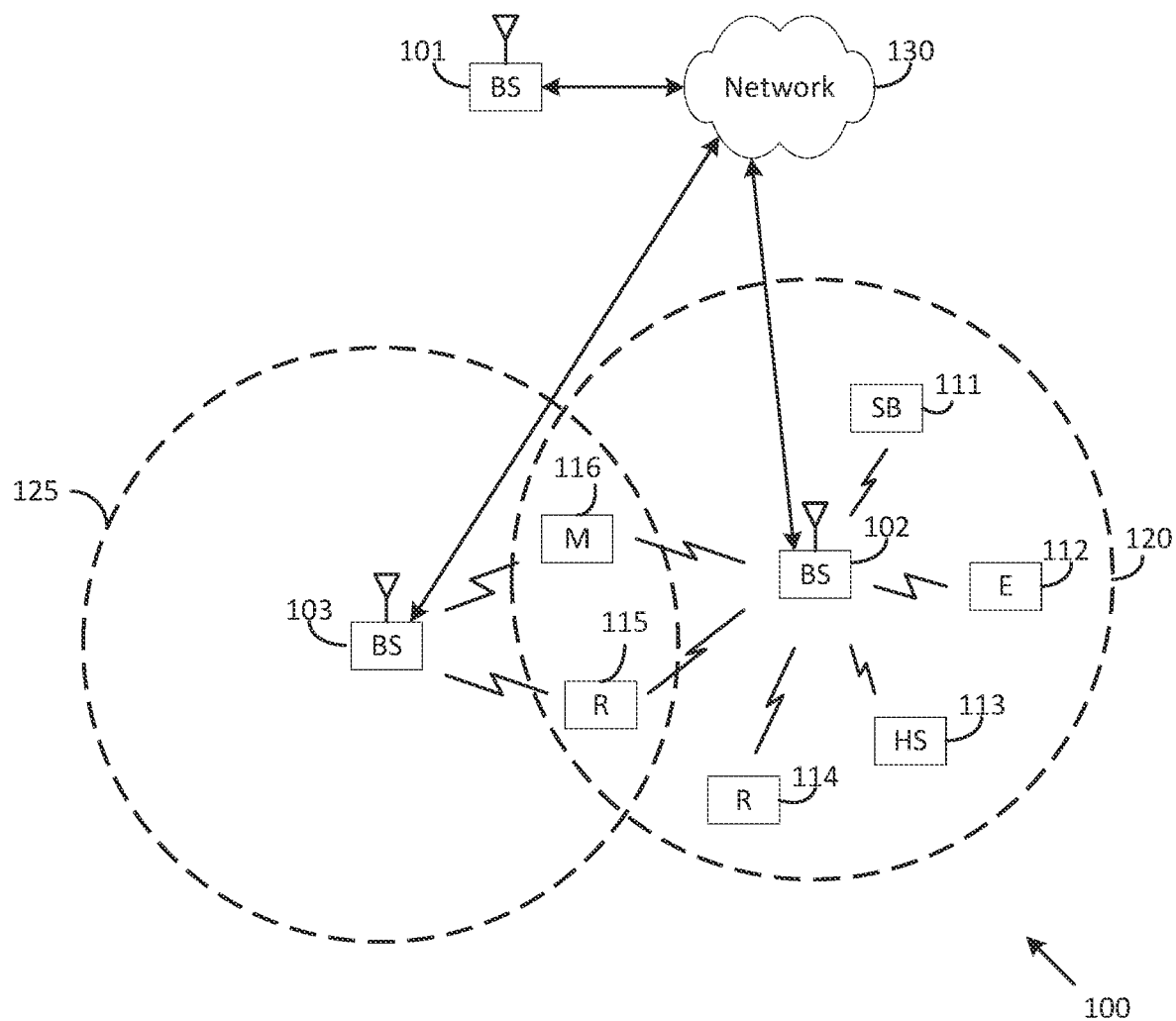
FIG. 1 illustrates an example wireless network according to embodiments of the present disclosure.
Figure 2:
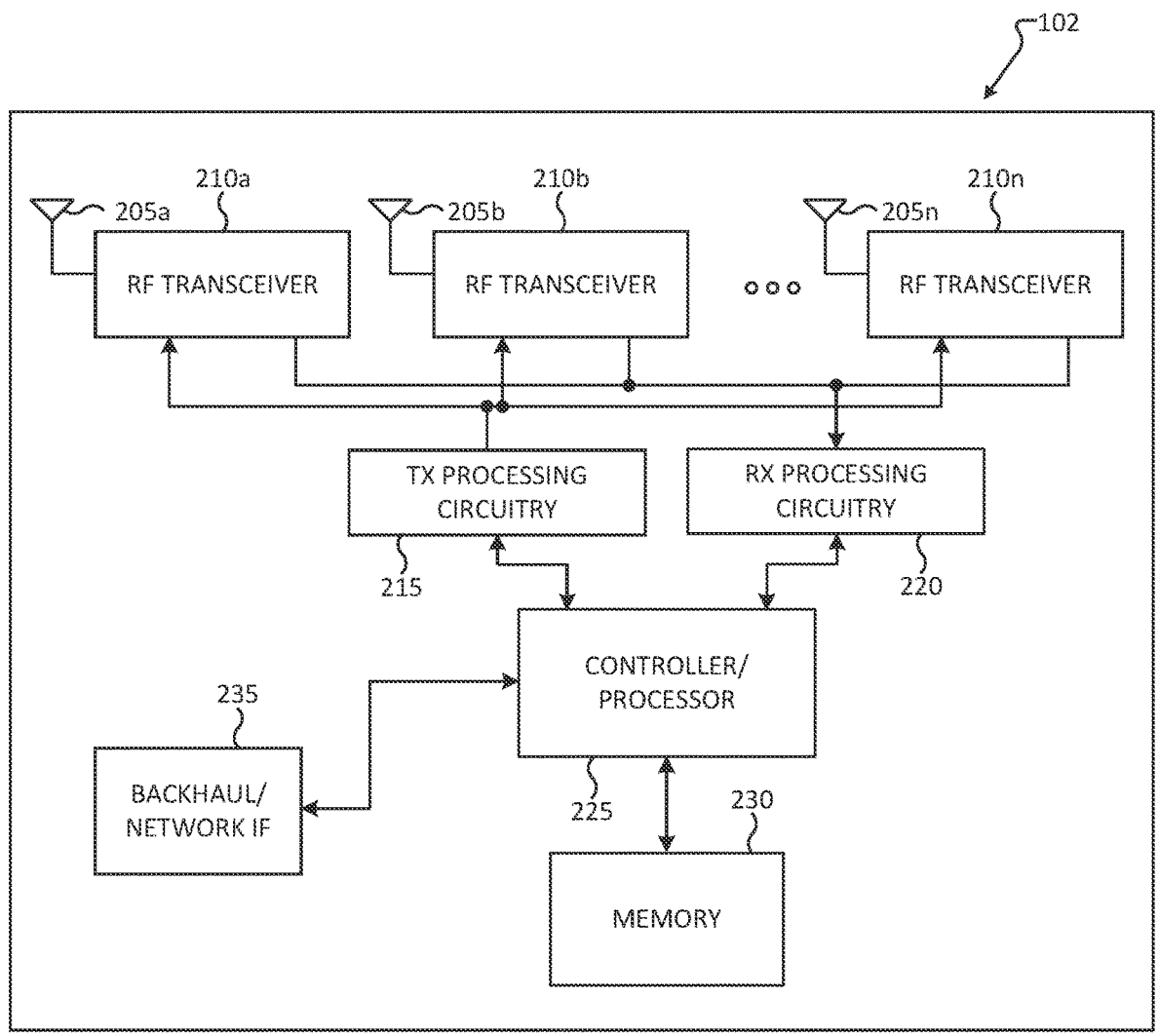
FIG. 2 illustrates an example gNB according to embodiments of the present disclosure.
Figure 3:
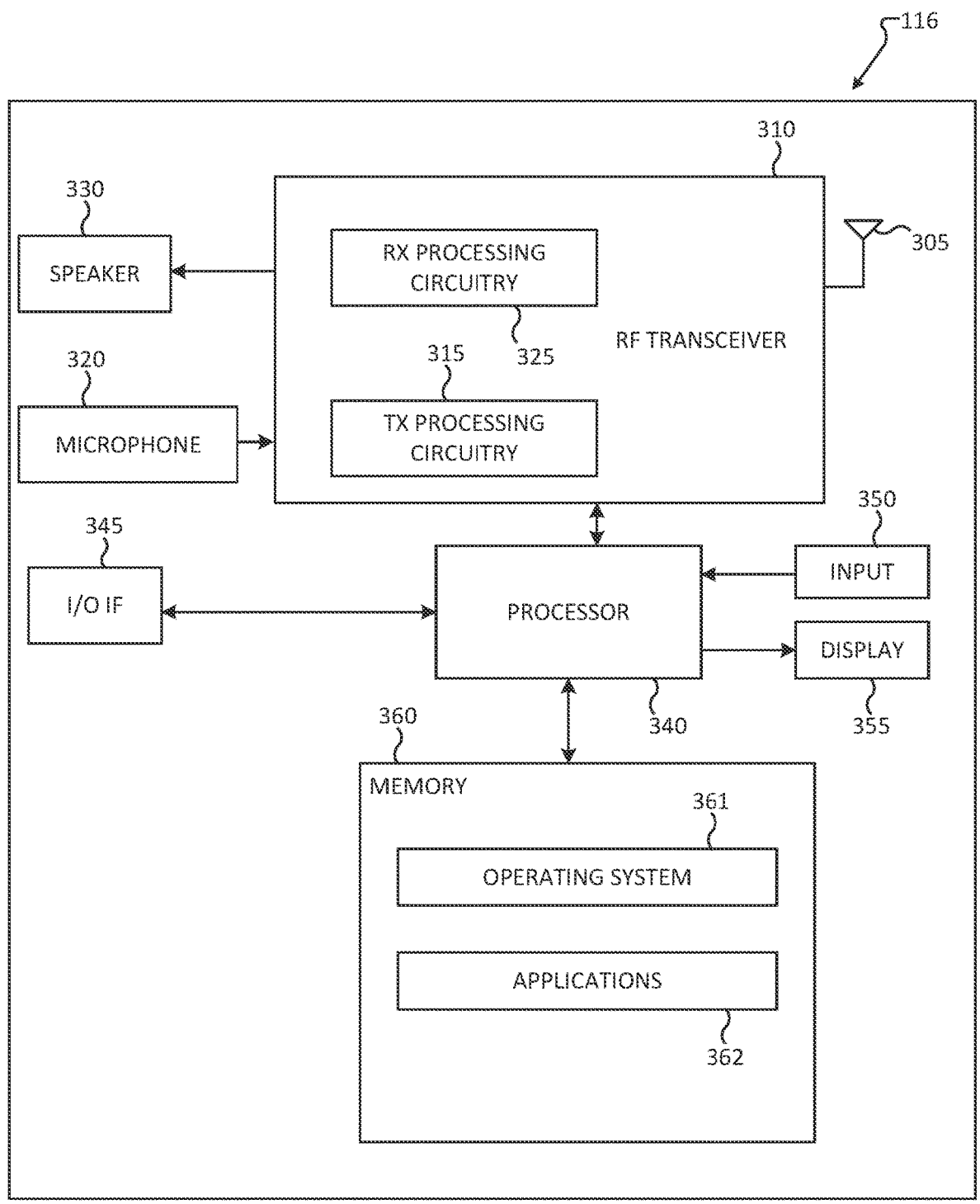
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for efficient control signaling design for improved resource utilization. In certain embodiments, and one or more of the gNBs 101-103 includes circuitry, programing, or a combination thereof, for efficient control signaling design for improved resource utilization.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver. The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems, efforts have been made to develop an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 GHz or 60 GHz bands or, in general, above 6 GHz bands, so as to accomplish higher data rates or in lower frequency bands, such as below 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems. In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A communication system includes a DL that refers to transmissions from a base station or one or more transmission points to UEs and an uplink (UL) that refers to transmissions from UEs to a base station or to one or more reception points.

A unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols, and an RB can include 12 SCs with inter-SC spacing of 30 kHz or 15 kHz, respectively. A unit of one RB in frequency and one symbol in time is referred to as physical RB (PRB).

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a PUSCH transmission from a UE is referred to as an UL DCI format.

A gNB transmits one or more of multiple types of RS including channel state information RS (CSI-RS) and demodulation RS (DM-RS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources are used. A CSI process consists of NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DM-RS is typically transmitted only within a BW of a respective PDCCH or PDSCH and a UE can use the DM-RS to demodulate data or control information.

Figure 4A:
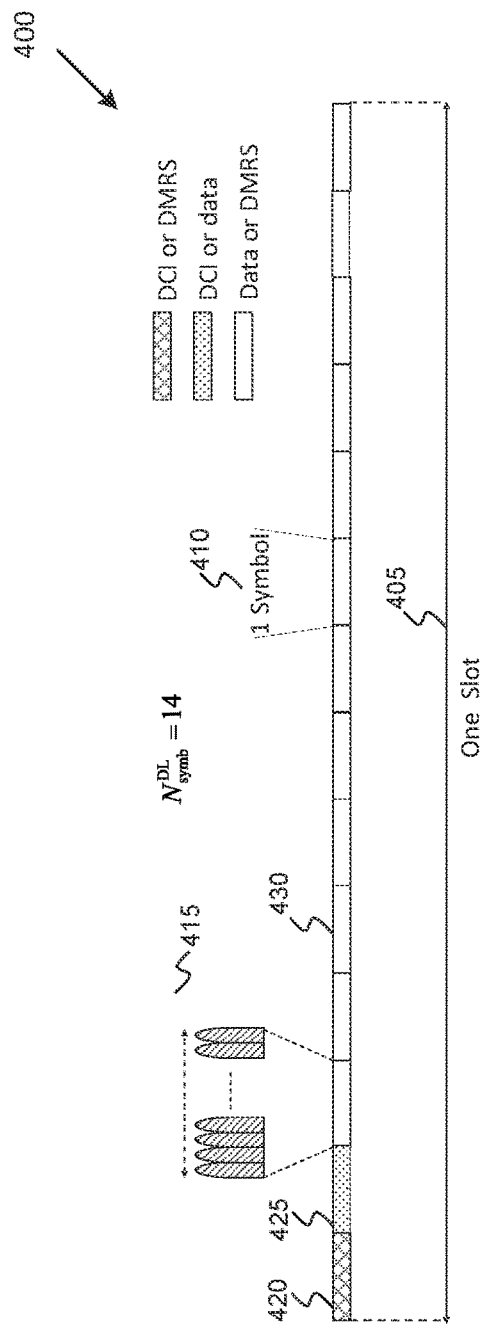
FIG. 4A illustrates an example DL slot structure according to embodiments of the present disclosure.

FIG. 4A illustrates an example DL slot structure 400 according to embodiments of the present disclosure. The embodiment of the DL slot structure 400 illustrated in FIG. 4A is for illustration only and could have the same or similar configuration. FIG. 4 does not limit the scope of this disclosure to any particular implementation.

As illustrated in FIG. 4A, a DL slot 405 includes $N_{symb}^{DL}$ symbols 410 where a gNB can transmit, for example, data information, DCI, or DM-RS. A DL system BW includes $N_{RB}^{DL}$ RBs. Each RB includes $N_{sc}^{RB}$ SCs. A UE is assigned $M_{PDSCH}$ RBs for a total of $M_{sc}^{PDSCH}=M_{PDSCH} \cdot N_{sc}^{RB}$ SCs 415 for a PDSCH transmission BW. A PDCCH conveying DCI is transmitted over control channel elements (CCEs) that are substantially spread across the DL system BW. A first slot symbol 420 can be used by the gNB to transmit PDCCH. A second slot symbol 425 can be used by the gNB to transmit PDCCH or PDSCH. Remaining slot symbols 430 can be used by the gNB to transmit PDSCH and CSI-RS. In some slots, the gNB can also transmit synchronization signals and channels that convey system information such as synchronization signals and primary broadcast channel (SS/PBCH) blocks.

UL signals also include data signals conveying information content, control signals conveying UL control information (UCI), DM-RS associated with data or UCI demodulation, sounding RS (SRS) enabling a gNB to perform UL channel measurement, and a random access (RA) preamble enabling a UE to perform random access. A UE transmits data information or UCI through a respective physical UL shared channel (PUSCH) or a physical UL control channel (PUCCH). A PUSCH or a PUCCH can be transmitted over a variable number of symbols in a slot including one symbol. When a UE simultaneously transmits data information and UCI, the UE can multiplex both in a PUSCH.

UCI includes hybrid automatic repeat request acknowledgement (HARQ-ACK) information, indicating correct or incorrect detection of data transport blocks (TBs) or of code block groups (CBGs) in a PDSCH, scheduling request (SR) indicating whether or not a UE has data in the UE's buffer, and CSI reports enabling a gNB to select appropriate parameters for PDSCH or PDCCH transmissions to a UE.

A CSI report from a UE can include a channel quality indicator (CQI) informing a gNB of a largest modulation and coding scheme (MCS) for the UE to detect a TB with a predetermined block error rate (BLER), such as a 10% BLER, a precoding matrix indicator (PMI) informing a gNB how to combine signals from multiple transmitter antennas in accordance with a multiple input multiple output (MIMO) transmission principle, a CSI-RS resource indicator (CRI) indicating a CSI-RS resource associated with the CSI report, and a rank indicator (RI) indicating a transmission rank for a PDSCH.

UL RS includes DM-RS and SRS. DM-RS is typically transmitted only within a BW of a respective PUSCH or PUCCH transmission. A gNB can use a DM-RS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random access channel (PRACH).

Figure 4B:
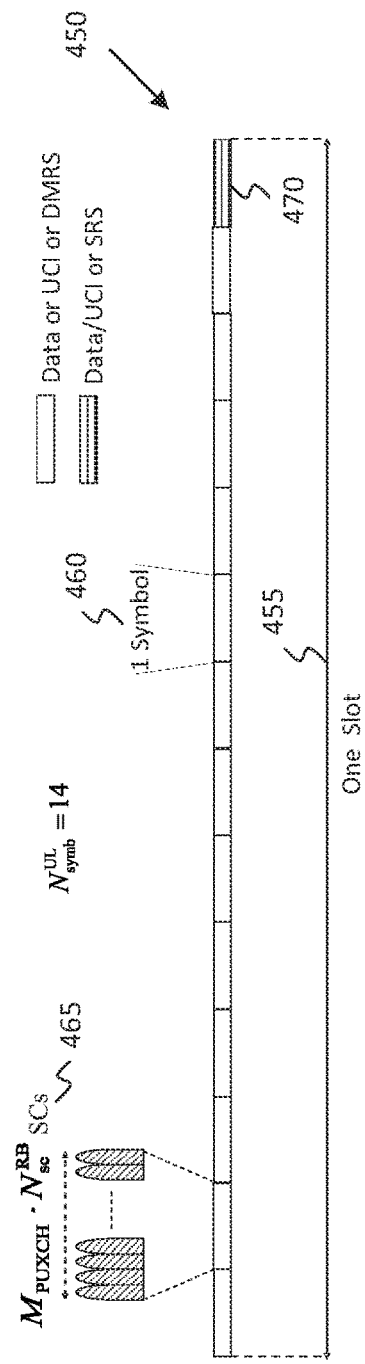
FIG. 4B illustrates an example DL slot structure according to embodiments of the present disclosure.

FIG. 4B illustrates an example UL slot structure 450 for PUSCH transmission or PUCCH transmission according to embodiments of the present disclosure. The embodiment of the UL slot structure 450 illustrated in FIG. 4B is for illustration only and could have the same or similar configuration. FIG. 4B does not limit the scope of this disclosure to any particular implementation.

As shown in FIG. 4B, a slot 455 includes $N_{symb}^{UL}$ symbols 460 where UE transmits, for example, data information, UCI, or DM-RS. An UL system BW includes $N_{RB}^{UL}$ RBs. Each RB includes $N_{sc}^{RB}$ SCs. A UE is assigned $M_{PUXCH}$ RBs for a total of $M_{sc}^{PUXCH}=M_{PUXCH} \cdot N_{sc}^{RB}$ SCs 465 for a PUSCH transmission BW ("X"="S") or for a PUCCH transmission BW ("X"="C"). Last one or more symbols of a slot can be used, for example, to multiplex SRS transmissions 470 or short PUCCH transmissions from one or more UEs.

Figure 5A:
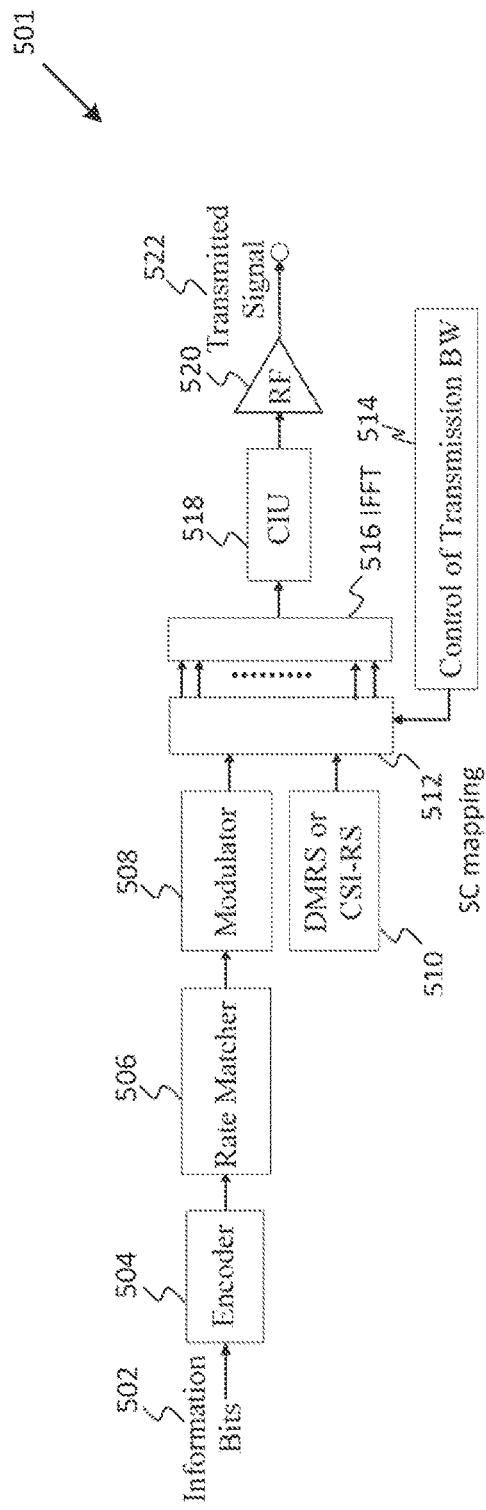
FIG. 5A illustrates an example transmitter structure using OFDM according to embodiments of the present disclosure.

FIG. 5A illustrates an example transmitter structure 501 using OFDM according to embodiments of the present disclosure. The embodiment of the transmitter structure 501 illustrated in FIG. 5A is for illustration only and could have the same or similar configuration. FIG. 5A does not limit the scope of this disclosure to any particular implementation.

As shown in FIG. 5A, information bits, such as DCI bits or data information bits 502, are encoded by encoder 504, rate matched to assigned time/frequency resources by rate matcher 506 and modulated by modulator 508. Subsequently, modulated encoded symbols and DM-RS or CSI-RS 510 are mapped to SCs by SC mapping unit 512, an inverse fast Fourier transform (IFFT) is performed by filter 516, a cyclic prefix (CP) is added by CP, and a resulting signal is filtered by filter 518 and transmitted by a radio frequency (RF) unit 520.

Figure 5B:
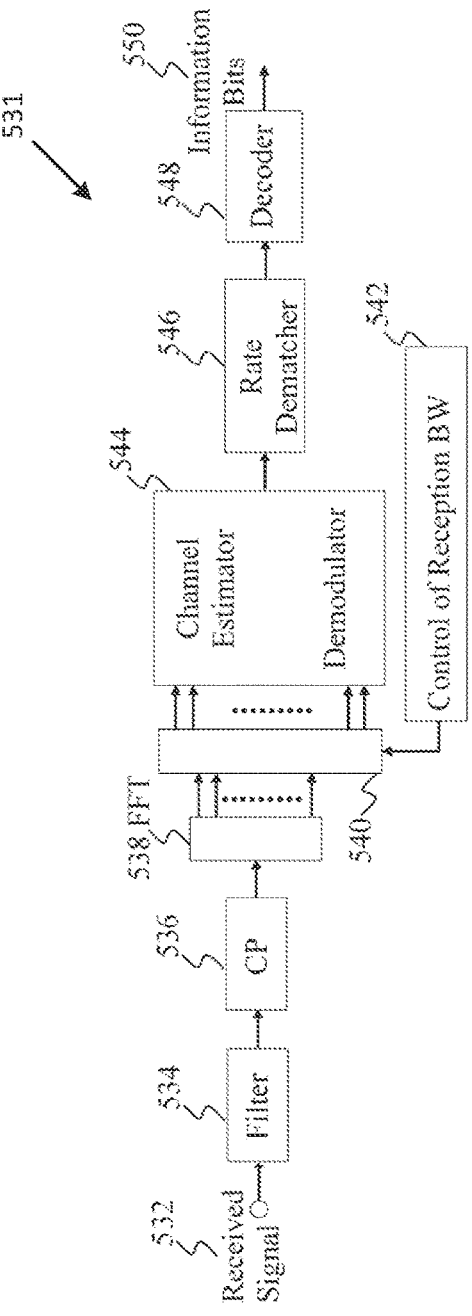
FIG. 5B illustrates an example receiver structure using OFDM according to embodiments of the present disclosure.

FIG. 5B illustrates an example receiver structure 531 using OFDM according to embodiments of the present disclosure. The embodiment of the receiver structure 531 illustrated in FIG. 5B is for illustration only and could have the same or similar configuration. FIG. 5B does not limit the scope of this disclosure to any particular implementation.

As shown in FIG. 5B, a received signal 532 is filtered by filter 534, a CP removal unit removes a CP 536, a filter 538 applies a fast Fourier transform (FFT), SCs de-mapping unit 540 de-maps SCs selected by BW selector unit 542, received symbols are demodulated by a channel estimator and a demodulator unit 544, a rate de-matcher 546 restores a rate matching, and a decoder 548 decodes the resulting bits to provide data information bits 550.

DL transmissions and UL transmissions can be based on an orthogonal frequency division multiplexing (OFDM) waveform including a variant using DFT precoding that is known as DFT-spread-OFDM.

If a UE indicates a carrier aggregation capability larger than 4 serving cells, the UE also indicates a maximum number of PDCCH candidates the UE can monitor per slot when the UE is configured for carrier aggregation operation over more than 4 cells. When a UE is not configured for dual connectivity operation, the UE determines a capability to monitor a total maximum number of PDCCH candidates per slot that corresponds to a maximum number of PDCCH candidates per slot for $N_{cells}^{cap}$ downlink cells, where $N_{cells}^{cap}$ is either the number of configured downlink cells or is indicated by the UE.

For each DL bandwidth part (BWP) configured to a UE in a serving cell, the UE can be provided by higher layer signaling with P≤3 control resource sets (CORESETs). For each CORESET, the UE is provided a CORESET index p, 0≤p<12, a DM-RS scrambling sequence initialization value, a precoder granularity for a number of resource element groups (REGs) in the frequency domain where the UE can assume use of a same DM-RS precoder, a number of consecutive symbols, a set of resource blocks (RBs), CCE-to-REG mapping parameters, an antenna port quasi co-location, from a set of antenna port quasi co-locations, indicating quasi co-location information of the DM-RS antenna port for PDCCH reception in a respective CORESET, and an indication for a presence or absence of a transmission configuration indication (TCI) field in a DCI format 1_1 transmitted by a PDCCH.

For each DL BWP configured to a UE in a serving cell, the UE is provided by higher layers with S≤10 search space sets. For each search space set from the S search space sets, the UE is provided with a search space set index s, 0≤s<40, an association between the search space set s and a CORESET p, a PDCCH monitoring periodicity of $k_s$ slots and a PDCCH monitoring offset of $o_s$ slots, a PDCCH monitoring pattern within a slot, indicating first symbol(s) of the CORESET within a slot for PDCCH monitoring, a duration of $T_s < k_s$ slots indicating a number of slots that the search space set s exists, a number of PDCCH candidates $M_s^{(L)}$ per CCE aggregation level L, and an indication that search space set s is either a common search space (CSS) set or a UE-specific (USS) set.

When search space set s is a CSS set, the UE is provided respective indications for whether or not to monitor PDCCH candidates for DCI formats from a set of predetermined DCI formats that schedule PDSCH receptions or PUSCH transmissions or provide control information. When search space set s is a USS set, the UE is provided respective indications whether or not to monitor PDCCH candidates either for DCI formats associated with scheduling PDSCH receptions or PUSCH transmissions.

A UE determines a PDCCH monitoring occasion on an active DL BWP from the PDCCH monitoring periodicity, the PDCCH monitoring offset, and the PDCCH monitoring pattern within a slot. For search space set s, the UE determines that a PDCCH monitoring occasion(s) exists in a slot with number $n_{s,f}^{\mu}$ in a frame with number $n_f$ if $(n_f \cdot N_{slot}^{frame,\mu} + n_{s,f}^{\mu} - o_s) \bmod k_s = 0$. The UE monitors PDCCH candidates for search space set s for $T_s$ consecutive slots, starting from slot $n_{s,f}^{\mu}$, and does not monitor PDCCH candidates for search space set s for the next $k_s - T_s$ consecutive slots.

A USS at CCE aggregation level L∈{1, 2, 4, 8, 16} is defined by a set of PDCCH candidates for CCE aggregation levels L. For a search space set s associated with CORESET p, the CCE indexes for aggregation level L corresponding to PDCCH candidate $m_{s,n_{CI}}$ of the search space set in slot $n_{s,f}^{\mu}$ for an active DL BWP of a serving cell corresponding to carrier indicator field value $n_{CI}$ are given by:

$$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \lfloor N_{CCE,p}/L \rfloor \right\} + i$$

where for any CSS, $Y_{p,n_{s,f}^{\mu}} = 0$, for a USS, $Y_{p,n_{s,f}^{\mu}} = (A_p \cdot Y_{p,n_{s,f}^{\mu}-1}) \bmod D$, $Y_{p,-1} = n_{RNTI} \neq 0$, $A_p = 39827$ for p mod 3=0, $A_p = 39829$ for p mod 3=1, $A_p = 39839$ for p mod 3=2, and D=65537, i=0, . . . , L−1; $N_{CCE,p}$ is the number of CCEs, numbered from 0 to $N_{CCE,p}-1$, in CORESET p; $n_{CI}$ is the carrier indicator field value if the UE is configured with a carrier indicator field for the serving cell on which PDCCH is monitored; otherwise, including for any CSS, $n_{CI}=0$, $m_{s,n_{CI}} = 0, \ldots, M_{s,n_{CI}}^{(L)} - 1$, where $M_{s,n_{CI}}^{(L)}$ is the number of PDCCH candidates the UE is configured to monitor for aggregation level L of a search space set s for a serving cell corresponding to $n_{CI}$, for any CSS, $M_{s,max}^{(L)} = M_{s,0}^{(L)}$, for a USS, $M_{s,max}^{(L)}$ is the maximum of $M_{s,n_{CI}}^{(L)}$ over all configured $n_{CI}$ values for a CCE aggregation level L of search space set s, and the radio network temporary identifier (RNTI) value used for $n_{RNTI}$ is a cell RNTI (C-RNTI).

A UE expects to monitor PDCCH candidates for up to 4 sizes of DCI formats that include up to 3 sizes of DCI formats with CRC scrambled by C-RNTI per serving cell. The UE counts a number of sizes for DCI formats per serving cell based on a number of configured PDCCH candidates in respective search space sets for the corresponding active DL BWP.

If a UE is configured with $N_{cells}^{DL,\mu}$ downlink cells for monitoring PDCCH with active DL BWPs or reference DL BWPs having SCS configuration μ where $\Sigma_{\mu}^{3} = N_{cells}^{DL,\mu} \leq N_{cells}^{cap}$, the UE is not required to monitor on the active DL BWPs of scheduling cells more than $M_{PDCCH}^{total,slot,\mu} = M_{PDCCH}^{max,slot,\mu}$ PDCCH candidates or more than $C_{PDCCH}^{total,slot,\mu} = C_{PDCCH}^{max,slot,\mu}$ non-overlapped CCEs per slot for each scheduled cell.

If a UE is configured with $N_{cells}^{DL,\mu}$ downlink cells for monitoring PDCCH with DL BWPs having SCS configuration μ, where $\Sigma_{\mu=0}^{3} = N_{cells}^{DL,\mu} > N_{cells}^{cap}$, a DL BWP of an activated cell is the active DL BWP of the activated cell, and a DL BWP of a deactivated cell is the DL BWP with index indicated by higher layers for the deactivated cell, such as a first active DL BWP, the UE is not required to monitor more than $M_{PDCCH}^{total,slot,\mu} = \lfloor N_{cells}^{cap} \cdot M_{PDCCH}^{max,slot,\mu} \cdot N_{cells}^{DL,\mu} / \Sigma_{j=0}^{3} N_{cells}^{DL,j} \rfloor$ PDCCH candidates or more than $C_{PDCCH}^{total,slot,\mu} = \lfloor N_{cells}^{cap} \cdot C_{PDCCH}^{max,slot,\mu} \cdot N_{cells}^{DL,\mu} / \Sigma_{j=0}^{3} N_{cells}^{DL,j} \rfloor$ non-overlapped CCEs per slot on the DL BWP(s) of scheduling cell(s) from the $N_{cells}^{DL,\mu}$ downlink cells.

For each scheduled cell, the UE is not required to monitor on the active DL BWP with SCS configuration μ of the scheduling cell more than $\min(M_{PDCCH}^{max,slot,\mu}, M_{PDCCH}^{total,slot,\mu})$ PDCCH candidates or more than $\min(C_{PDCCH}^{max,slot,\mu}, C_{PDCCH}^{total,slot,\mu})$ non-overlapped CCEs per slot.

A UE does not expect to be configured CSS sets that result to corresponding total, or per scheduled cell, numbers of monitored PDCCH candidates and non-overlapped CCEs per slot that exceed the corresponding maximum numbers per slot. For same cell scheduling or for cross-carrier scheduling where a scheduling cell and scheduled cell(s) have DL BWPs with same SCS configuration μ, a UE does not expect a number of PDCCH candidates and a number of corresponding non-overlapped CCEs per slot on a secondary cell to be larger than the corresponding numbers that the UE is capable of monitoring on the secondary cell per slot. For cross-carrier scheduling, the number of PDCCH candidates for monitoring and the number of non-overlapped CCEs per slot are separately counted for each scheduled cell.

For all search space sets within a slot n, denote by $S_{CSS}$ a set of CSS sets with cardinality of $I_{CSS}$ and by $S_{USS}$ a set of USS sets with cardinality of $J_{USS}$. The location of USS sets $s_j$, $0 \leq j < J_{USS}$, in $S_{USS}$ is according to an ascending order of the search space set index. Denote by $M_{S_{CSS}(i)}^{(L)}$, $0 \leq i < I_{CSS}$, the number of counted PDCCH candidates for monitoring for CSS set $S_{CSS}(i)$ and by $M_{S_{USS}(j)}^{(L)}$, $0 \leq j < J_{USS}$, the number of counted PDCCH candidates for monitoring for USS set $S_{USS}(j)$.

For the CSS sets, a UE monitors $M_{PDCCH}^{CSS} = \Sigma_{i=0}^{I_{CSS}-1} \Sigma_L M_{S_{CSS}(i)}^{(L)}$ PDCCH candidates requiring a total of $C_{PCCH}^{CSS}$ non-overlapping CCEs in a slot.

The UE allocates PDCCH candidates for monitoring to USS sets for the primary cell having an active DL BWP with SCS configuration μ in slot n according to the following pseudocode as shown in TABLE 1. Denote by $V_{CCE}(S_{USS}(j))$ the set of non-overlapping CCEs for search space set $S_{USS}(j)$ and by $C(V_{CCE}(S_{USS}(j)))$ the cardinality of $V_{CCE}(S_{USS}(j))$ where the non-overlapping CCEs for search space set $S_{USS}(j)$ are determined considering the allocated PDCCH candidates for monitoring for the CSS sets and the allocated PDCCH candidates for monitoring for all search space sets $S_{USS}(k)$, $0 \leq k \leq j$.

TABLE 1

Pseudocode

Set $M_{PDCCH}^{uss} = \min(M_{PDCCH}^{max,slot,\mu}, M_{PDCCH}^{total,slot,\mu}) - M_{PDCCH}^{css}$
Set $C_{PDCCH}^{uss} = \min(C_{PDCCH}^{max,slot,\mu}, C_{PDCCH}^{total,slot,\mu}) - C_{PDCCH}^{css}$
Set j = 0
while $\Sigma_L M_{S_{uss}(j)}^{(L)} \leq M_{PDCCH}^{uss}$ AND $C(V_{CCE}(S_{uss}(j))) \leq C_{PDCCH}^{uss}$
allocate $\Sigma_L M_{S_{uss}(j)}^{(L)}$ PDCCH candidates for monitoring to USS set $S_{uss}(j)$
$M_{PDCCH}^{uss} = M_{PDCCH}^{uss} - \Sigma_L M_{S_{uss}(j)}^{(L)}$;
$C_{PDCCH}^{uss} = C_{PDCCH}^{uss} - C(V_{CCE}(S_{uss}(j)))$;
j = j + 1;
end while A time span for PDCCH monitoring is defined by a pair of (X,Y) values in the unit of symbols. For any two PDCCH monitoring occasions of a same search space set or of different search space sets, there is a minimum time separation of X symbols (including the cross-slot boundary case) between the start of two spans (span gap). Each span is of length up to Y consecutive symbols, starts at a first symbol where a PDCCH monitoring occasion starts, and ends at a last symbol where a PDCCH monitoring occasion ends. For example, Y can be the largest CORESET length for search space sets that the UE monitors PDCCH within X consecutive symbols.

A UE can perform additional PDCCH monitoring within a slot when the additional PDCCH monitoring starts at least after X symbols from the start of a previous one. A first search space set can be associated with a smaller PDCCH monitoring time span, or at least with a smaller span gap value X, than a second search space set because, for example, the first search space set can be associated with scheduling applications requiring shorter latency requirements that the second search space set. A total number of PDCCH candidates and a total number of non-overlapped CCEs for a UE configured search space sets with different PDCCH monitoring span gaps X needs to therefore be determined.

PDCCH transmissions can represent material overhead of DL resources or, for a flexible duplex system, of total resources. For example, when a UE density per cell is large, such as for machine-type communications that is also often referred to as internet-of-things (IoT) communications, a number of PDCCH transmissions from a gNB per slot on a cell can potentially consume a large percentage of frequency resources on the cell. Further, a bandwidth of a cell may be shared for transmission with different radio access technologies, such as long term evolution (LTE) and new radio (NR), and resources for PDCCH transmission may not always be available.

Although PDCCH transmissions can be avoided when PDSCH receptions or PUSCH or PUCCH transmissions by UEs are configured by higher layers, such as by radio resource control (RRC) signaling, this results to inflexible network operation without a possibility for fast link adaptation and with any change in the communication setup requiring reconfigurations by higher layer signaling.

For example, several attributes related to receptions by a UE or transmissions from a UE on a cell, such as time-frequency resources (patterns) for rate matching receptions or transmissions, are provided/configured to UEs by higher layers through common system information or through UE-specific information. A reconfiguration of such attributes requires the UEs to be paged and then scheduled PDSCH reception, by a DCI format in a PDCCH, for system information providing the reconfiguration or for each UE to be individually provided the reconfiguration in a scheduled PDSCH reception by a DCI format in a PDCCH. Those mechanisms to update a configuration of communication parameters, based on paging and subsequent system information update or based on UE-specific higher layer signaling for each UE, are difficult for a network to support and this limits an ability of the network to flexibly adapt to variations in traffic or channel medium characteristics. Similar, for configuration of parameter values such as a modulation and coding scheme (MCS) table, or for a time domain resource allocation (TDRA) table by UE-specific RRC signaling, or of a transmission configuration indication (TCI) state for a CORESET, a delay for a reconfiguration of the parameter values by RRC signaling can be too large in some case and this also limits an ability of a network to adapt to changing traffic or channel conditions or to UE mobility.

Therefore, there is a need to enable a network to utilize available control signaling resources and distribute control signaling across cells or BWPs based on instantaneous traffic requirements.

There is another need to enable a UE to receive or transmit control signaling in parts of a bandwidth that is larger than a bandwidth where the UE receives or transmits data signaling.

There is another need to determine a total number of PDCCH candidates and a total number of non-overlapped CCEs that a UE that is configured with different PDCCH monitoring span gaps can be expected to monitor at a given time.

Finally, there is another need to enable a network to provide updates to a configuration of communication parameters without using higher layer signaling.

The present disclosure relates to a pre-5$^{th}$-generation (5G) or 5G communication system to be provided for supporting higher data rates beyond 4$^{th}$-generation (4G) communication system such as long term evolution (LTE). The present disclosure relates to enabling a network to utilize available control signaling resources and distribute control signaling across cells or BWPs based on instantaneous traffic requirements. The present disclosure also relates to enabling a UE to receive or transmit control signaling in parts of a bandwidth that is larger than a bandwidth where the UE receives or transmits data signaling. The present disclosure additionally relates to determining a total number of PDCCH candidates and a total number of non-overlapped CCEs that a UE that is configured with different PDCCH monitoring span gaps can be expected to monitor at a given time. The present disclosure further relates to enabling a network to provide updates to a configuration of communication parameters without using higher layer signaling.

In one embodiment, configurations for a UE are considered in order for the UE to receive PDCCH candidates on multiple cells, or on multiple BWPs of a cell, or on a BWP that includes a BWP for PDSCH receptions, where a PDCCH reception provides a DCI format that schedules a PDSCH reception or a PUSCH transmission on a BWP of the cell. In such embodiments, configurations are also considered for a UE to transmit PUCCH on multiple cells, or on multiple BWPs of a cell, where the UE transmits a PUCCH on a cell from the multiple cells or on a BWP from the multiple BWPs of the cell.

A UE can be configured search space sets on different cells to monitor PDCCH candidates for DCI formats scheduling PDSCH receptions or PUSCH transmissions on a cell. For example, for scheduling a PUSCH transmission on a first cell from a UE, the UE can be configured a first search space set on the first cell (or on a third cell) to monitor PDCCH candidates for a DCI format scheduling the PUSCH transmission on the first cell and a second search space set on a second cell to monitor PDCCH candidates for a DCI format scheduling the PUSCH transmission on the first cell.

In one example, it can be beneficial for a gNB to use the second search space set for a PDCCH transmission to the UE, for example, when a PDCCH transmission from the first search space set would be blocked by another PDCCH transmission or by other signaling, or when a CORESET for the first search space set would be underutilized by having only one PDCCH transmission, or, for example, for operation on unlicensed spectrum, when a PDCCH transmission from the first search space set is not possible due to blocked channel access.

A UE can therefore be simultaneously configured for self-carrier (self-cell) scheduling on a first cell using a first search space set for PDCCH receptions on the first cell and for cross-carrier (cross-cell) scheduling on the first cell from a second cell using a second search space set for PDCCH receptions on the second cell. For the first search space set for scheduling PDSCH receptions or PUSCH transmissions on the first cell, a carrier indicator field value is $n_{CI}=0$. For the second search space set, the carrier indicator field value is different than 0, such as $n_{CI}=1$, and can be provided by higher layer signaling to the UE by the gNB, or the carrier indicator field value can be determined according to the cell index or according to a number of cells used for cross-carrier scheduling on the cell.

When a UE monitors PDCCH in a BWP of a first cell with a SCS configuration $\mu_1$ and the UE monitors PDCCH in a BWP of the first cell with a SCS configuration $\mu_2$ for scheduling PDSCH receptions or PUSCH transmissions on the BWP of the first cell, the UE counts the PDCCH candidates and non-overlapping CCEs of the first search space set in a total number of PDCCH candidates and non-overlapping CCEs for monitoring PDCCH on DL BWPs of cells with SCS configuration $\mu_1$ and counts the PDCCH candidates and non-overlapping CCEs of the second search space set in a total number of PDCCH candidates and non-overlapping CCEs for monitoring PDCCH on DL BWPs of cells with SCS configuration $\mu_2$.

Figure 6:
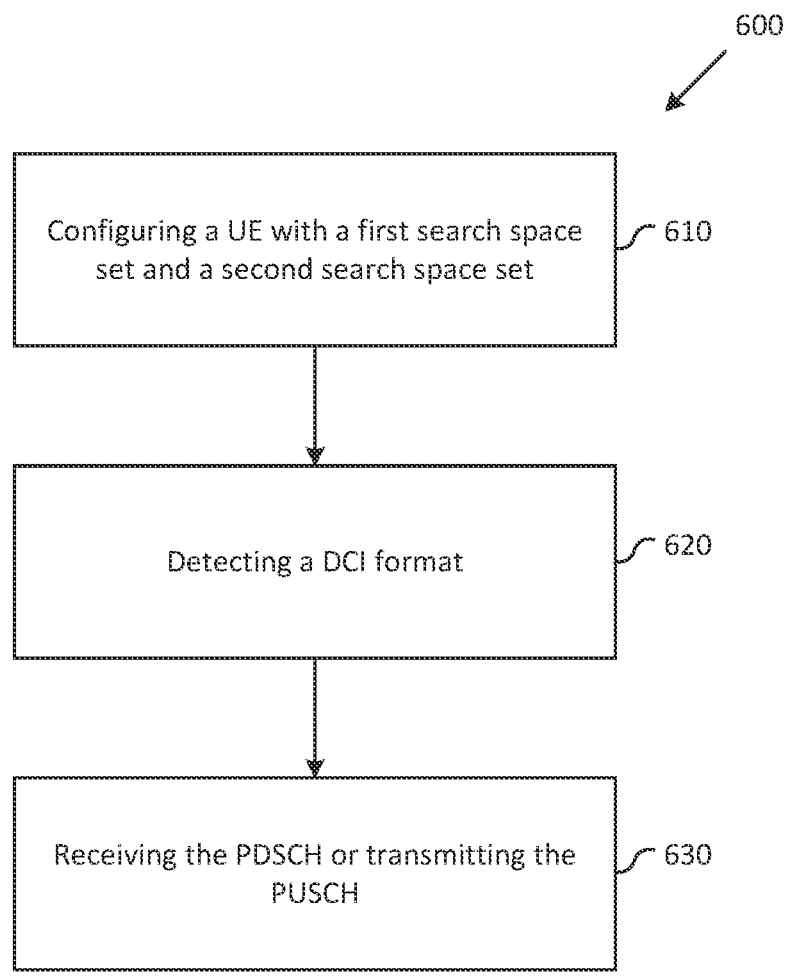
FIG. 6 illustrates a flow chart of a UE procedure for a search space set according to embodiments of the present disclosure.

FIG. 6 illustrates a flow chart of a UE procedure 600 for a search space set according to embodiments of the present disclosure. For example, FIG. 6 illustrates a configuration to a UE of a first search space set on a first cell and of a second search space set on a second cell for scheduling PDSCH receptions to or PUSCH transmissions for the UE. An embodiment of the UE procedure 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 6, a UE is configured a first search space set associated with a CORESET on a first cell and a second search space set associated with a CORESET on a second cell for scheduling PDSCH receptions to the UE or PUSCH transmissions from the UE on the first cell in step 610. The UE detects a DCI format either in a PDCCH reception from the first search space set or in a PDCCH reception from the second search space set where the DCI format schedules a PDSCH reception or a PUSCH transmission during a time period on the first cell in step 620. The UE can expect to detect only one DCI format that schedules a PDSCH reception or a PUSCH transmission in non-overlapping time resources, or in non-overlapping frequency resources, on the first cell. The UE receives the PDSCH or transmits the PUSCH over the time period on the first cell in step 630.

The configurations of the first and second search space sets can be unrestricted and allow for time-overlapping PDCCH monitoring occasions, such as PDCCH monitoring occasions within a same slot or within a same span gap X, or can be restricted to allow only non-overlapping PDCCH monitoring occasions, such as PDCCH monitoring occasions according to the first search space set are not in a same slot or in a same span gap X as PDCCH monitoring occasions according to the second search space set.

Instead of enabling a configuration for self-carrier scheduling and cross-carrier scheduling on an active DL BWP or UL BWP through a respective configuration of search space sets, it is also possible that self-carrier scheduling or cross-carrier scheduling is a BWP-specific configuration parameter. For example, when a UE has a first DL BWP as an active BWP on a cell, self-carrier scheduling is used to schedule PDSCH receptions to the UE on the first DL BWP of the cell while when the UE has a second DL BWP as an active BWP on the cell, cross-carrier scheduling is used to schedule PDSCH receptions to the UE on the second DL BWP of the cell.

For example, this can be beneficial when a UE experiences different interference conditions in different BWPs. In such case, cross-carrier scheduling can be used when the UE experiences larger interference in the BWP because PDCCH receptions do not benefit from HARQ retransmissions. For example, this can be beneficial when a gNB prefers to use a BWP for PDSCH (and CSI-RS) transmissions without control signaling overhead for PDCCH transmissions. Then, with an active BWP change indication by a DCI format in a PDCCH reception, a latency for the UE to switch between self-carrier and cross-carrier scheduling for a scheduled cell is minimized.

A UE can be configured with a first BWP for PDCCH receptions and a second BWP for PDSCH receptions. The second BWP can be included in the first BWP. The second BWP may also not be directly defined as a separate BWP; instead, the UE may be configured for PDSCH receptions in a part of the first BWP. A frequency domain resource allocation field in a DCI format scheduling a PDSCH reception can address only the second BWP. This can enable a UE to receive PDCCH over a wider BWP in order to provide more PDCCH resources and avoid blocking of PDCCH transmissions particularly when multiple UEs can be scheduled at a same PDCCH monitoring occasion. A frequency domain resource allocation for a PDSCH reception can be limited to a smaller bandwidth, for example for applications associated with receptions of small transport blocks, and a corresponding field in a DCI format scheduling the PDSCH reception can be dimensioned according to the smaller bandwidth.

A UE can be configured with PUCCH resources in different BWPs of a cell or in different cells. This can be beneficial for a gNB to dynamically balance PUCCH resource overhead among different BWPs or cells, adapt to channel medium and interference conditions that a UE experiences in different BWPs or cells, account for a cell availability such as when a first cell operates on unlicensed spectrum and a second cell operates on licensed spectrum, and so on. For example, a PUCCH resource set can include PUCCH resources in different BWPs of a cell or in different cells. A BWP index or a cell index can be included in the parameters identifying a PUCCH resource such as an associated PUCCH format. A PUCCH resource indicator field in a DCI format can indicate a PUCCH resource, that also includes a BWP index or a cell index, for a PUCCH transmission.

For example, when a BWP index or a cell index is not part of a PUCCH resource, a separate field can be included in a DCI format triggering a PUCCH transmission from a UE to indicate a BWP index or a cell index for the PUCCH transmission. Depending on the cell for the PUCCH transmission, the UE can be configured to apply a separate accumulation of TPC commands for determining a PUCCH transmission power according to a respective cell index.

Figure 7:
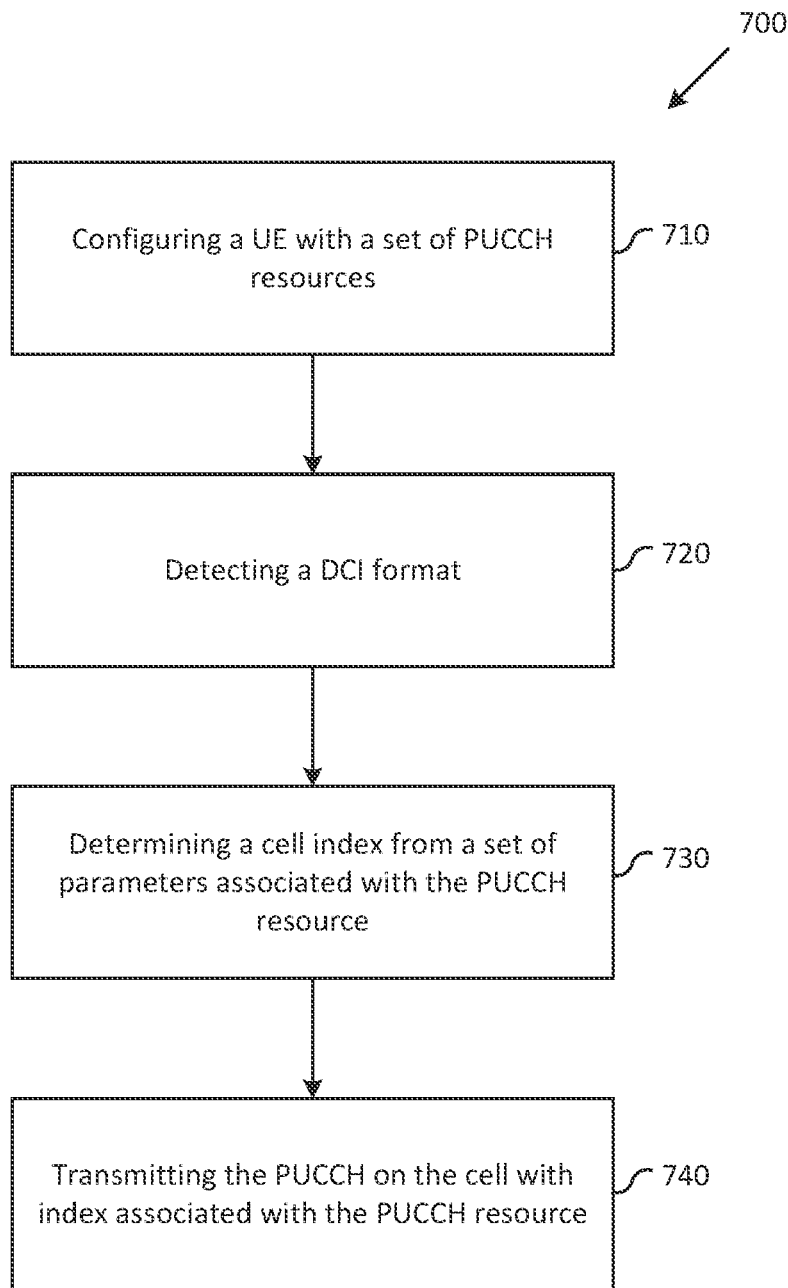
FIG. 7 illustrates a flow chart of a UE procedure to determine a cell for a PUCCH transmission according to embodiments of the present disclosure.

FIG. 7 illustrates a flow chart of a UE procedure 700 to determine a cell for a PUCCH transmission according to embodiments of the present disclosure. An embodiment of the UE procedure 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 7, a UE is configured a set of PUCCH resources. A PUCCH resource includes a cell index in step 710. The UE detects a DCI format that indicates a PUCCH resource for a PUCCH transmission in step 720. For example, the DCI format can be a last DCI format from a set of DCI formats that indicate a PUCCH transmission within a same time interval such as a slot. The UE determines a cell index that is included in a set of parameters associated with the PUCCH resource in step 730. The UE transmits the PUCCH on the cell with index associated with the PUCCH resource in step 740.

In one embodiment, a determination for a total number of PDCCH candidates and a total number of non-overlapped CCEs that a UE is expected to monitor for search space sets with different PDCCH monitoring span gaps is considered.

When a UE is configured to monitor PDCCH candidates over different time spans (X, Y) on a same cell, the UE determines a total number of PDCCH candidates and a total number of non-overlapped CCEs that the UE can monitor in the active DL BWP of the cell according to corresponding UE capabilities for the smallest gap of the time spans.

For example, when a UE indicates a capability to monitor $M_1$ PDCCH candidates and $C_1$ non-overlapped CCEs for a time span of $(X_1, Y_1)$ symbols and to monitor $M_2$ PDCCH candidates and $C_2$ non-overlapped CCEs for a time span of $(X_2, Y_2)$ symbols, where $X_2 < X_1$ and $Y_2 \le Y_1$, and the UE is configured to monitor PDCCH for a first search space set with periodicity of $X_1$ symbols and a second search space set with periodicity of $X_2$ symbols, the number of PDCCH candidates and the number of non-overlapped CCEs the UE is expected to monitor can be determined based on the UE capability for the smaller gap corresponding to the time span of $(X_2, Y_2)$ symbols.

For example, when $X_1=7$, $X_2=2$, and $Y_1=Y_2=2$, the UE determines a number of PDCCH candidates and a number of overlapping CCEs to monitor based on $M_2$ and $C_2$. Therefore, $M_{PDCCH}^{max,slot,\mu}$ and $C_{PDCCH}^{max,slot,\mu}$ can be replaced by $M_{PDCCH}^{max,X_{min},\mu}$ and $C_{PDCCH}^{max,X_{min},\mu}$, where $M_{PDCCH}^{max,X_{min},\mu}$ and $C_{PDCCH}^{max,X_{min},\mu}$ are the maximum number of PDCCH candidates and non-overlapped CCEs that a UE can monitor for a PDCCH monitoring span with a smallest gap value of X. Similar, $M_{PDCCH}^{total,slot,\mu}$ and $C_{PDCCH}^{total,slot,\mu}$ can be replaced by $M_{PDCCH}^{total,X_{min},\mu}$ and $C_{PDCCH}^{total,X_{min},\mu}$. Equivalently, if a UE can monitor PDCCH with a first time span of $(X_1, Y_1)$ symbols and with a second time span of $(X_2, Y_2)$ symbols, where $X_2 < X_1$ and $Y_2 \le Y_1$, and the UE is configured to monitor PDCCH with consecutive occasions separated by at least $X_1$ symbols, the UE monitors PDCCH according to the first time span of $(X_1, Y_1)$ symbols.

Figure 8A:
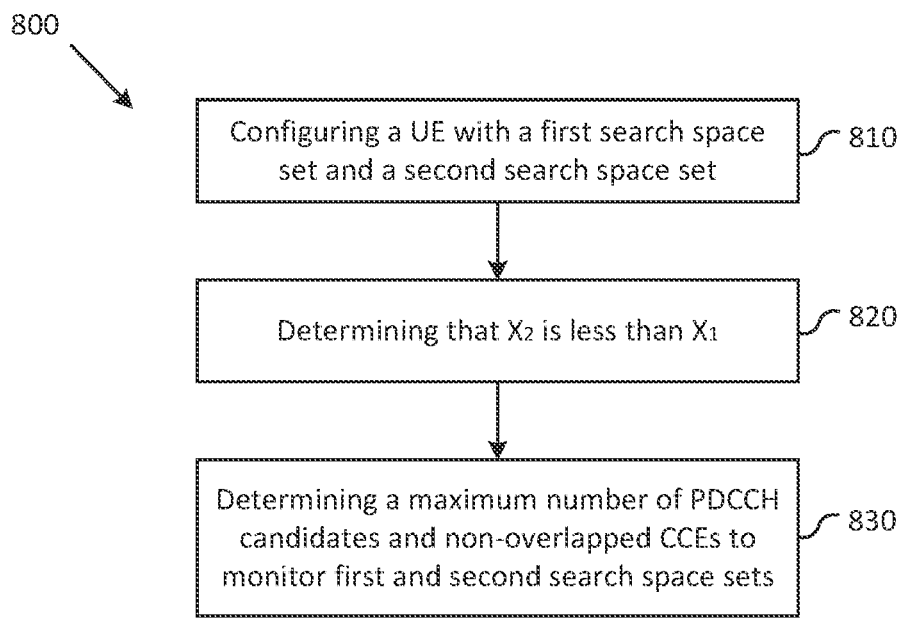
FIG. 8A illustrates a flow chart of UE procedure to determine PDCCH candidates according to embodiments of the present disclosure.

FIG. 8A illustrates a flow chart of UE procedure 800 to determine PDCCH candidates according to embodiments of the present disclosure. An embodiment of the UE procedure 800 shown in FIG. 8A is for illustration only. One or more of the components illustrated in FIG. 8A can be implemented in specialized circuitry configured to perform the noted functions or one or more of the components can be implemented by one or more processors executing instructions to perform the noted functions. Other embodiments are used without departing from the scope of the present disclosure.

Figure 8B:
FIG. 8B illustrates an example for determining PDCCH candidates according to embodiments of the present disclosure.

FIG. 8B illustrates an example for determining PDCCH candidates 840 according to embodiments of the present disclosure. An embodiment of the PDCCH candidates 840 shown in FIG. 8B is for illustration only. One or more of the components illustrated in FIG. 8B can be implemented in specialized circuitry configured to perform the noted functions or one or more of the components can be implemented by one or more processors executing instructions to perform the noted functions. Other embodiments are used without departing from the scope of the present disclosure.

FIGS. 8A and 8B illustrate a determination by a UE of a maximum number of PDCCH candidates and of a maximum number of non-overlapped CCEs according to this disclosure.

As illustrated in FIG. 8A, a UE is configured first and second search space sets with time spans of $(X_1, Y_1)$ symbols and of $(X_2, Y_2)$ symbols, respectively in step 810. For example, $X_1=7$ 842, $Y_1=3$ 844, $X_2=4$ 852 and $Y_2=2$ 854.

The search space sets can be on an active BWP of a same cell or of different cells with a same SCS configuration p. The UE determines that $X_2<X_1$ in step 820. The UE subsequently determines a maximum number of PDCCH candidates and a maximum number of non-overlapped CCEs to monitor per any span according to a maximum number of PDCCH candidates and a maximum number of non-overlapped CCEs for the indicated UE capability for ($X_2$, $Y_2$) in step 830. The determination can be as previously described for $M_{PDCCH}^{max,span\_min,\mu}$ and $C_{PDCCH}^{max,span\_min,\mu}$ and for $M_{PDCCH}^{total,X_{min},\mu}$ and $C_{PDCCH}^{total,X_{min},\mu}$.

In order to account for a UE capability to monitor a larger number of PDCCH candidates or a larger number of non-overlapped CCEs as a value of X increases, for example, $M_1>M_2$ or $C_1>C_2$ for $X_1>X_2$, the UE can determine a total number of PDCCH candidates $M_{PDCCH}^{total,X,\mu}$ and a total number of non-overlapped CCEs $C_{PDCCH}^{total,X,\mu}$ per PDCCH monitoring span gap for each value of X associated with a search space set on an active BWP of a cell with SCS configuration μ by scaling with a ratio between a number of search space sets with span gap of X symbols and a number of all search space sets on active BWPs of cells with SCS configuration μ.

When a UE is configured with $N_{cells}^{DL,\mu}$ downlink cells for monitoring PDCCH with DL BWPs having SCS configuration y and search space sets with PDCCH monitoring span gap of at least X symbols, where $\Sigma_{\mu=0}^{3} N_{cells}^{DL,\mu} > N_{cells}^{cap}$, a DL BWP of an activated cell is the active DL BWP of the activated cell, and a DL BWP of a deactivated cell is the DL BWP with index indicated by higher layers for the deactivated cell, the UE is not required to monitor more than a total of $M_{PDCCH}^{total,X,\mu} = \lfloor N_{cells}^{cap} \cdot M_{PDCCH}^{max,X,\mu} \cdot N_{cells}^{DL,\mu} \cdot S_X^{\mu} / (\Sigma_x S_X^{\mu} \cdot \Sigma_{j=0}^{3} N_{cells}^{DL,j}) \rfloor$ PDCCH candidates or more than a total of $C_{PDCCH}^{total,X,\mu} = \lfloor N_{cells}^{cap} \cdot C_{PDCCH}^{max,X,\mu} \cdot N_{cells}^{DL,\mu} \cdot S_X^{\mu} / (\Sigma_x S_X^{\mu} \cdot \Sigma_{j=0}^{3} N_{cells}^{DL,j}) \rfloor$ non-overlapped CCEs per PDCCH monitoring span gap of X symbols on the DL BWP(s) of scheduling cell(s) from the $N_{cells}^{DL,\mu}$ downlink cells where $M_{PDCCH}^{max,X,\mu}$ and $C_{PDCCH}^{max,X,\mu}$ are respectively a maximum number of PDCCH candidates and a maximum number of non-overlapped CCEs that the UE can monitor for span gap of X symbols for SCS configuration μ, $S_X^{\mu}$ is a total number of search space sets over all DL BWPs of cells with SCS configuration μ, and $\Sigma_x S_X^{\mu}$ is a sum of all search space sets on active BWPs of cells with SCS configuration μ.

Considering the aforementioned approach for a UE configured to monitor PDCCH for multiple time spans (X, Y) on an active DL BWP of a cell to determine a total number of PDCCH candidates or a total number of non-overlapped CCEs for PDCCH monitoring over the DL BWP of the cell according to the smallest gap X of the time spans, and denoting by $N_{cells}^{DL,X,\mu}$ a number of cells from the $N_{cells}^{DL,\mu}$ downlink cells where the UE monitors PDCCH according to a (smallest for the DL BWP of the cell) span gap of X symbols, $N_{cells}^{DL,\mu} \cdot S_X^{\mu} / \Sigma_x S_X^{\mu}$ is same as $N_{cells}^{DL,X,\mu}$. Then, the UE is not required to monitor more than a total of $M_{PDCCH}^{total,X,\mu} = \lfloor N_{cells}^{cap} \cdot M_{PDCCH}^{max,X,\mu} \cdot N_{cells}^{DL,X,\mu} / \Sigma_{j=0}^{3} N_{cells}^{DL,j} \rfloor$ PDCCH candidates or more than a total of $C_{PDCCH}^{total,X,\mu} = \lfloor N_{cells}^{cap} \cdot C_{PDCCH}^{max,X,\mu} \cdot N_{cells}^{DL,X,\mu} / \Sigma_{j=0}^{3} N_{cells}^{DL,j} \rfloor$ non-overlapped CCEs per PDCCH monitoring span gap of X symbols on the $N_{cells}^{DL,X,\mu}$ cells.

A UE can declare a PDCCH monitoring capability for a number of cells $N_{cells}^{cap}$ that is larger than a number of configured cells for all SCS configurations $\mu (\Sigma_{\mu=0}^{3} N_{cells}^{DL,\mu})$. In that case, for any PDCCH monitoring span gap X, as an alternative allocation of PDCCH candidates and non-overlapping CCEs to scheduled cells that fully utilizes the PDCCH monitoring capability of the UE, the UE can be expected to monitor a maximum number of PDCCH candidates or a maximum number of non-overlapped CCEs, that is larger than a maximum number of PDCCH candidates $M_{PDCCH}^{max,X,\mu}$ or a Maximum Number of Non-Overlapped CCEs $C_{PDCCH}^{max,X,\mu}$, respectively, when the UE does not declare a PDCCH monitoring capability for a number of cells or when a number of configured cells for all SCS configurations $\mu (\Sigma_{\mu=0}^{3} N_{cells}^{DL,\mu})$ is larger than or equal to $N_{cells}^{cap}$.

For example, the UE can be expected to monitor a maximum number of PDCCH candidates determined as $$M_{PDCCH}^{total,X,\mu} = \left\lfloor \frac{N_{cells}^{cap}}{\sum_{j=0}^{3} N_{cells}^{DL,j}} \cdot M_{PDCCH}^{max,X,\mu} \right\rfloor$$

and a maximum number of non-overlapped CCEs determined as $$C_{PDCCH}^{total,X,\mu} = \left\lfloor \frac{N_{cells}^{cap}}{\sum_{j=0}^{3} N_{cells}^{DL,j}} \cdot C_{PDCCH}^{max,X,\mu} \right\rfloor$$

or, per $N_{cells}^{DL,X,\mu}$ cells, as $$M_{PDCCH}^{total,X,\mu} = \left\lfloor \frac{N_{cells}^{cap}}{\sum_{j=0}^{3} N_{cells}^{DL,j}} \cdot N_{cells}^{DL,X,\mu} \cdot M_{PDCCH}^{max,X,\mu} \right\rfloor$$

or $$C_{PDCCH}^{total,X,\mu} = \left\lfloor \frac{N_{cells}^{cap}}{\sum_{j=0}^{3} N_{cells}^{DL,j}} \cdot N_{cells}^{DL,X,\mu} \cdot C_{PDCCH}^{max,X,\mu} \right\rfloor$$

A UE can be configured with a total number of cells ($\Sigma_{\mu=0}^{3} N_{cells}^{DL,\mu}$) that is larger than a UE capability of $N_{cells}^{cap}$ a for PDCCH monitoring. Regardless of a PDCCH monitoring span gap and considering for simplicity a PDCCH monitoring capability per slot, a total number of PDCCH candidates $M_{PDCCH}^{total,slot,\mu} = \lfloor N_{cells}^{cap} \cdot M_{PDCCH}^{max,slot,\mu} \cdot N_{cells}^{DL,\mu} / \Sigma_{j=0}^{3} N_{cells}^{DL,j} \rfloor$ and a total number of non-overlapped CCEs $C_{PDCCH}^{total,slot,\mu} = \lfloor N_{cells}^{cap} \cdot C_{PDCCH}^{max,slot,\mu} \cdot N_{cells}^{DL,\mu} / \Sigma_{j=0}^{3} N_{cells}^{DL,j} \rfloor$ may be smaller than $M_{PDCCH}^{max,slot,\mu} \cdot \Sigma_{j=0}^{3} N_{cells}^{DL,j}$ or $C_{PDCCH}^{max,slot,\mu} \cdot \Sigma_{j=0}^{3} N_{cells}^{DL,j}$, respectively. Then, a UE and a serving gNB need to have a common understanding for a partitioning of the $M_{PDCCH}^{total,slot,\mu}$ PDCCH candidates and of the $C_{PDCCH}^{total,slot,\mu}$ non-overlapped CCEs among the $N_{cells}^{DL,\mu}$ for each SCS configuration μ.

In one embodiment, when an active BWP on a primary cell has SCS configuration μ, the UE allocates $M_{PDCCH}^{max,slot,\mu}$ PDCCH candidates and $C_{PDCCH}^{max,slot,\mu}$ non-overlapped CCEs, from the $M_{PDCCH}^{total,slot,\mu}$ a PDCCH candidates and the $C_{PDCCH}^{total,slot,\mu}$ non-overlapped CCEs, to the primary cell and distributes remaining $M_{PDCCH}^{total,slot,\mu} - M_{PDCCH}^{max,slot,\mu}$ PDCCH candidates and remaining $C_{PDCCH}^{total,slot,\mu} - C_{PDCCH}^{max,slot,\mu}$ non-overlapped CCEs to secondary cells with SCS configuration μ, when any.

In one example, the UE allocates $\lfloor (M_{PDCCH}^{total,slot,\mu} - M_{PDCCH}^{total,slot,\mu})/(N_{cells}^{DL,\mu}-1) \rfloor$ PDCCH candidates and $\lfloor (C_{PDCCH}^{total,slot,\mu} - C_{PDCCH}^{max,slot,\mu})/(N_{cells}^{DL,\mu}-1) \rfloor$ non-overlapped CCEs to each secondary cell. For example, the UE allocates PDCCH candidates and non-overlapped CCEs to each secondary cell according to a respective configuration of search space sets subject to the per cell maximum number of PDCCH candidates and non-overlapped CCEs, $M_{PDCCH}^{max,slot,\mu}$ and $C_{PDCCH}^{max,slot,\mu}$ respectively, and subject to the total number of PDCCH candidates and non-overlapped CCEs across all secondary cells not exceeding $M_{PDCCH}^{total,slot,\mu} - M_{PDCCH}^{max,slot,\mu}$ and $C_{PDCCH}^{total,slot,\mu} - C_{PDCCH}^{max,slot,\mu}$, respectively. When an active BWP on a primary cell does not have SCS configuration $\mu$, the UE allocates $M_{PDCCH}^{total,slot,\mu}$ PDCCH candidates and $C_{PDCCH}^{total,slot,\mu}$ non-overlapped CCEs to secondary cells with SCS configuration $\mu$, when any.

In another example, an allocation for a number of PDCCH candidates or for a number of non-overlapping CCEs to secondary cells is not specified and, for all CSS sets and USS sets associated with all secondary cells, the UE expects that a total number of PDCCH candidates does not exceed $M_{PDCCH}^{total,slot,\mu} - M_{PDCCH}^{max,slot,\mu}$ and a total number of non-overlapping CCEs does not exceed $C_{PDCCH}^{total,slot,\mu} - C_{PDCCH}^{max,slot,\mu}$ while a maximum number of PDCCH candidates per slot is $M_{PDCCH}^{max,slot,\mu}$, and a maximum number of non-overlapping CCEs per slot is $C_{PDCCH}^{max,slot,\mu}$ per scheduled secondary cell with DL BWP having SCS configuration $\mu$.

In one embodiment, regardless of whether a cell is a primary cell or a secondary cell, the UE allocates $M_{PDCCH}^{total,slot,\mu}$ PDCCH candidates and $C_{PDCCH}^{total,slot,\mu}$ non-overlapped CCEs to cells with SCS configuration $\mu$, when any, and it is up to the gNB scheduler to ensure that a total number of PDCCH candidates and non-overlapping CCEs across all scheduling cells with SCS configuration $\mu$ does not exceed $M_{PDCCH}^{total,slot,\mu}$ and $C_{PDCCH}^{total,slot,\mu}$, respectively. In another example, the UE directly computes a number of PDCCH candidates and a number of non-overlapped CCEs per cell with SCS configuration $\mu$ as $M_{PDCCH}^{cell,slot,\mu} = N_{cells}^{cap} \cdot M_{PDCCH}^{max,slot,\mu} / \Sigma_{j=0}^{3} N_{cells}^{DL,j} \rfloor$ and as $C_{PDCCH}^{cell,slot,\mu} = \lfloor N_{cells}^{cap} \cdot M_{PDCCH}^{max,slot,\mu} / \Sigma_{j=0}^{3} N_{cells}^{DL,j} \rfloor$ respectively.

The aforementioned embodiments and/or examples are also directly applicable to any PDCCH monitoring span gap X according to any of the previous approaches regarding PDCCH monitoring as a function of a PDCCH monitoring span gap.

In one embodiment, usage of a DCI format in a PDCCH is considered to indicate configurations of parameters related to UE-specific information or to system information that is provided by a gNB for a cell or for BWPs of a cell.

A UE can be provided an RNTI, such as a config-RNTI, for scrambling a CRC of a DCI format. For brevity, the DCI format may be referred to as DCI format S. The UE can determine CCEs for a reception of a PDCCH that provides the DCI format through a corresponding common search space (CSS). The DCI format S can have a same size as another DCI format that the UE is configured to monitor in a same CORESET according to a CSS or according to a UE-specific search space (USS).

In addition, instead of providing a separate RNTI, one bit field or a combination of bit field values in a DCI format that the UE is also configured to monitor PDCCH for can be used to indicate a functionality of the DCI format. For example, a 1-bit field can be included in a DCI format to indicate whether the DCI format schedules a PDSCH with system information, or with paging information, or whether the DCI format provides TPC commands, and so on, or whether the DCI format indicates values for parameters that are also provided by (UE-common or UE-specific) system information.

The UE can be provided by higher layers from a gNB a set of values for each parameter from a set of parameters. For example, a parameter can be a ControlResourceSetZero and the UE can be provided a value controlResourceSetZero that provides an index of a CORESET with index 0 from a set of CORESETs. For example, a parameter can be a CommonControlResourceSet and the UE can be provided a value CommonControlResourceSet for a common control resource set with index other than 0 that can be associated with CSS or USS. For example, a parameter can be a SearchSpaceZero and the UE can be provided a value SearchSpaceZero for a common search space with index 0 in a BWP other than an initial BWP.

For example, a value can be a search space index such as for a searchSpaceSIB1 or a pagingSearchSpace or a ra-SearchSpace for the UE to monitor PDCCH for DCI formats scheduling a SIB1, a paging message, or a random access response, respectively, such as in a BWP other than an initial BWP.

For example, a value can be a ssb-PositionsInBurst that indicates time domain positions of transmitted SS/BPCH blocks in a half frame where a first/leftmost bit corresponds to SS/PBCH block index 0, a second bit corresponds to SS/PBCH block index 1, and so on. A value of 0 or 1 in the bitmap indicates respectively that a corresponding SS/PBCH block is not transmitted or is transmitted.

For example, a value can be a ssb-PeriodicityServingCell that indicates a periodicity of SS/PBCH block transmissions for UEs with receptions in an associated BWP to rate match the receptions with respect to the SS/PBCH block resources.

For example, a value can be a ss-PBCH-BlockPower that indicates an average energy per resource element (EPRE), in dBm, for resource elements that the gNB used to transmit secondary synchronization signals in SS/PBCH blocks.

For example, a value can be a tdd-UL-DL-Configuration-Common that indicates an UL/DL configuration for flexible duplex (TDD) operation such as for example over 10 msec.

For example, a value can be a rateMatchPatternToAdd-ModList that indicates resources patterns for a to use for rate matching of PDSCH receptions of same SCS configuration. For example, a value can be for a number of PDCCH candidates per CCE aggregation level for search space sets of DCI formats associated with common search spaces such as for such as for searchSpaceSIB1, pagingSearchSpace or ra-SearchSpace.

For example, a value can be used to enable or disable PDCCH monitoring in one or more search space sets for DCI formats having associated PDCCH candidates with CCE locations determined by a common search space such as for a DCI format providing TPC commands to a group of UEs or for a DCI format indicating resources with interrupted transmissions to a group of UEs.

A UE can be configured a set of parameters having values provided by DCI format S or the set of parameters can be predetermined in a system operation. The UE can also be configured a starting position and a size for a bit field in DCI format S where a value for a parameter is provided or the position or the size for the bit field in DCI format S can be predetermined in the system operation. The UE can also be provided a search space set for monitoring PDCCH candidates providing DCI format S or DCI format S can be associated with a search space set with predetermined index, such as 0, and the UE can monitor PDCCH for associated PDCCH candidates in a corresponding CORESET such as a CORESET with index 0.

The UE may also be configured a set of BWPs that the values of the parameters are applicable or the set of BWPs can be predetermined in the system operation and, for example, include only the BWP of the PDCCH reception that provides DCI format S.

Figure 9:
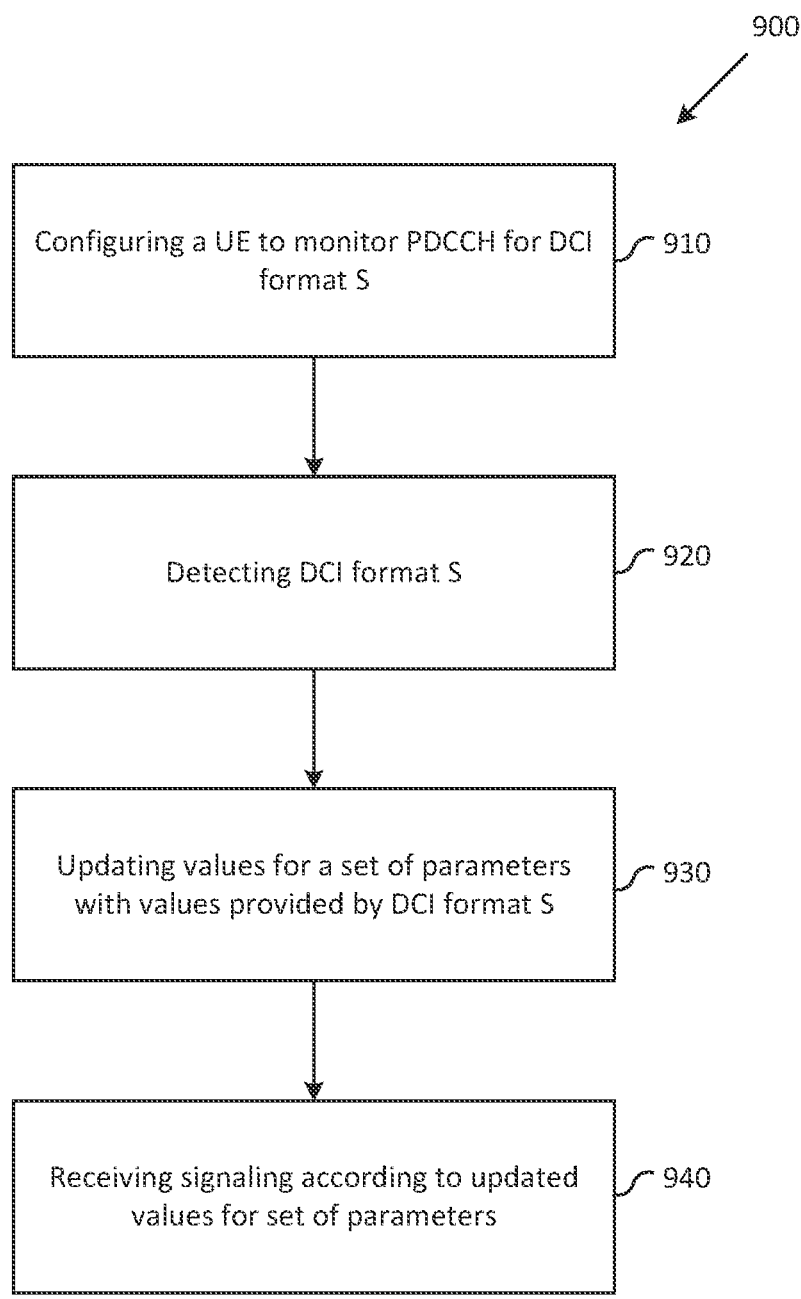
FIG. 9 illustrates a flow chart of UE procedure to determine values for a set of parameters according to embodiments of the present disclosure.

FIG. 9 illustrates a flow chart of UE procedure 900 to determine values for a set of parameters according to embodiments of the present disclosure. An embodiment of the UE procedure 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 9, a UE is configured to monitor PDCCH for a DCI format S that includes fields providing values for a set of parameters in step 910. The DCI format S does not schedule a PDSCH reception or a PUSCH transmission. For example, the set of parameters can include one or more of a ControlResourceSetZero, commonControlResourceSet, searchSpaceZero, searchSpaceSIB1, pagingSearchSpace, ra-SearchSpace, ssb-PositionsInBurst, ssb-PeriodicityServingCell, ss-PBCH-BlockPower, tdd-UL-DL-ConfigurationCommon, rateMatchPatternToAddModList, or a number of PDCCH candidates per CCE aggregation level for search space sets of some or all of DCI formats associated with common search spaces such as for searchSpaceSIB1, pagingSearchSpace or ra-SearchSpace. The UE detects format S in step 920. The UE updates values for set of parameters with values provided by DCI format S in step 930. The UE receives signaling according to the updated values for set of parameters in step 940.

In to providing updates to parameters associated with system information, it possible for DCI format S to be a UE-specific DCI format, such as a DCI format with CRC scrambled by a C-RNTI, and provide an update to values of parameters used by a UE to receive PDSCH or to transmit PUSCH. For example, the DCI format can be one that the UE monitors according to USS sets for scheduling a PDSCH reception or a PUSCH transmission. Several methods can apply for differentiating the contents of the DCI format between scheduling PDSCH reception or a PUSCH transmission and indicating updated values for parameters associated with PDSCH receptions or PUSCH transmission, including using (a) a different RNTI, (b) a flag field indicating an interpretation for the remaining fields of the DCI format, (c) a predetermined combination of values of predetermined fields of the DCI format so that the remaining fields of the DCI format can be interpreted as indicating a reconfiguration of values for parameters used for PDSCH receptions or PUSCH transmissions, and so on.

For example, when a UE experiences channel conditions that deteriorate, a reconfiguration of values of parameters for the UE to receive PDSCH or transmit PUSCH can include an indication of an MCS table or of a CQI table with lower spectral efficiency values, an indication of a time-domain resource allocation (TDRA) table that includes (more) repetitions for a PDSCH reception or a PUSCH transmission, an indication of a different group of search space sets that include a larger number of PDCCH candidates for the larger CCE aggregation levels, and so on. The reverse can apply when the UE experiences channel conditions that improve.

Each parameter value to be indicated can be from a set of predetermined values of parameters in the system operation or from a set of values of parameters that are provided by higher layers. For example, a set of 3 or 4 MCS tables, or a set of 3 or 4 CQI tables, or a number of RB groups indicated by a frequency domain resource allocation (FDRA) field, can be predetermined in the system operation and one can be indicated by the DCI format. For example, a set of search space set groups, such as two set groups, or a set of CORESET groups, such as two CORESET groups, or a set of TDRA tables, such as 4 TDRA tables, and so on, can be provided by higher layers and one element of a set can be indicated by the DCI format. For example, a TCI state for a CORESET can be indicated from a set of TCI states that was previously provided by higher layers and, for example, a PDCCH transmission providing the DCI format can be in a different CORESET such as a CORESET with index 0 for which a TCI state may not be adapted. Such adaptation of parameter values results to a smaller latency as compared to a reconfiguration of the parameter values by higher layer signaling and to a more robust system operation. Even though the DCI format does not schedule a reception of TBs in a PDSCH or a transmission of TBs in a PUSCH, the UE can provide HARQ-ACK information in response to the detection of the DCI format.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to:
transmit capability information for physical downlink control channel (PDCCH) receptions on a downlink (DL) cell according to at least two (X,Y) combinations, wherein the PDCCH receptions are in any symbols of a span, a length of a span is up to Y symbols in a slot, and a number of symbols between first symbols of two consecutive spans is X; and
receive configuration information of one or more search space sets for the PDCCH receptions on the DL cell; and
a processor operably coupled with the transceiver, the processor configured to, in case that the UE indicates a capability to monitor at least one PDCCH according to the at least two combinations and the UE is configured the one or more search space sets with first symbols of consecutive spans separated by at least a value of X for one or more of the at least two combinations, determine to monitor the at least one PDCCH according to a combination with a largest value of X from the one or more combinations,
wherein a larger maximum number of PDCCH candidates is associated with a larger value of X, and
wherein the transceiver is further configured to receive the at least one PDCCH on the DL cell based on the configuration information.

2. The UE of claim 1, wherein, in case that the UE indicates the capability to monitor the at least one PDCCH according to the at least two combinations and the UE is configured the one or more search space sets with first symbols of consecutive spans separated by at least the larger value of X for the at least two combinations, the processor is configured to determine to monitor the at least one PDCCH according to a first combination with the larger value of X for the at least two combinations.

3. The UE of claim 1, wherein, in case that the UE indicates the capability to monitor the at least one PDCCH according to the at least two combinations and the UE is configured the one or more search space sets with first symbols of consecutive spans separated by at least a smaller value of X for the at least two combinations, the processor is configured to determine to monitor the at least one PDCCH according to a second combination with the smaller value of X for the at least two combinations.

4. The UE of claim 1, wherein the processor is further configured to determine to monitor the at least one PDCCH according to the combination that is associated with the larger maximum number of PDCCH candidates and a larger maximum number of non-overlapping control channel elements (CCEs) per span.

5. The UE of claim 1, wherein:
the transceiver is configured to receive a configuration of $N_{cells}^{DL,j}$ DL cells,
scheduling on the $N_{cells}^{DL,j}$ DL cells is by corresponding PDCCH receptions having a sub-cells carrier spacing (SCS) value of $2^j \cdot 15$ kHz, $j=0, \ldots J$, where J is a predetermined number of SCS values, and
the processor is configured to determine the maximum number of PDCCH candidates and a maximum number of non-overlapped CCEs to $$M_{PDCCH}^{total,X,\mu} = \lfloor N_{cells}^{cap} \cdot M_{PDCCH}^{max,X,\mu} \cdot N_{cells}^{DL,X,\mu} / \Sigma_{j=0}^{J} N_{cells}^{DL,j} \rfloor$$

and $$C_{PDCCH}^{total,X,\mu} = \lfloor N_{cells}^{cap} \cdot C_{PDCCH}^{max,X,\mu} \cdot N_{cells}^{DL,X,\mu} / \Sigma_{j=0}^{J} N_{cells}^{DL,j} \rfloor$$ respectively, where:
$N_{cells}^{cap}$ is a number of DL cells configured to or indicated by the UE,
$M_{PDCCH}^{max,X,\mu}$, $C_{PDCCH}^{max,X,\mu}$ are respectively a maximum number of PDCCH candidates and a maximum number of non-overlapped CCEs that the UE can monitor for a span gap of X symbols for subcarrier spacing (SCS) configuration $\mu$,
$N_{cells}^{DL,X,\mu}$ is a number of cells from $N_{cells}^{DL,\mu}$ DL cells where the UE monitors PDCCH according to a span gap of X symbols, and
$\lfloor \ \rfloor$ is a 'floor' function that rounds a number to a next smaller integer.

6. The UE of claim 1, wherein:
the transceiver is further configured to receive:
PDCCHs on the DL cell according to the search space sets,
a configuration of second search space sets for PDCCH receptions on a second DL cell,
PDCCHs on the second DL cell according to the second search space sets, and
first and second physical downlink shared channels (PDSCHs) on the DL cell, the first and second PDSCHs providing first and second transport blocks (TBs), respectively, wherein the first PDSCH is scheduled by a first downlink control information (DCI) format provided by a PDCCH reception on the DL cell, the first DCI format includes a carrier indicator field (CIF) with a value 0, the second PDSCH is scheduled by a second DCI format provided by a PDCCH reception on the second DL cell, and the second DCI format includes a CIF with a value other than 0; and wherein the transceiver is further configured to:
transmit, on a first cell, a physical uplink control channel (PUCCH) with hybrid automatic repeat request acknowledgement (HARQ-ACK) information for the first TB, and
transmit, on a second cell, a PUCCH with HARQ-ACK information for the second TB, wherein the first and second DCI formats include a field indicating a cell for a PUCCH transmission.

7. A base station comprising:
a transceiver configured to:
receive, from a user equipment (UE), capability information for physical downlink control channel (PDCCH) receptions on a downlink (DL) cell according to at least two (X,Y) combinations, wherein the PDCCH receptions are in any symbols of a span, a length of a span is up to Y symbols in a slot, and a number of symbols between first symbols of two consecutive spans is X, and
transmit configuration information of one or more search space sets for the PDCCH receptions on the DL cell; and
a processor operably coupled with the transceiver, the processor configured to determine to transmit at least one PDCCH to the UE,
wherein, in case that the UE indicates a capability to monitor the at least one PDCCH according to the at least two combinations and the UE is configured the one or more search space sets with first symbols of consecutive spans separated by at least a value of X for one or more of the at least two combinations, a combination to be used for PDCCH monitoring is determined as one with a largest value of X from the one or more combinations,
wherein a larger maximum number of PDCCH candidates is associated with a larger value of X, and
wherein the transceiver is further configured to transmit, to the UE, the at least one PDCCH on the DL cell based on the configuration information.

8. The base station of claim 7, wherein, in case that the UE indicates the capability to monitor the at least one PDCCH according to the at least two combinations and the UE is configured the one or more search space sets with first symbols of consecutive spans separated by at least the larger value of X for the at least two combinations, the combination to be used for PDCCH monitoring is determined as a first combination with the larger value of X for the at least two combinations.

9. The base station of claim 7, wherein, in case that the UE indicates the capability to monitor the at least one PDCCH according to the at least two combinations and the UE is configured the one or more search space sets with first symbols of consecutive spans separated by at least a smaller value of X for the at least two combinations, the combination to be used for PDCCH monitoring is determined as a second combination with the smaller value of X for the at least two combinations.

10. The base station of claim 7, wherein the at least one PDCCH is determined according to the combination that is associated with the larger maximum number of PDCCH candidates and a larger maximum number of non-overlapping control channel elements (CCEs) per span.

11. The base station of claim 7, wherein:
the transceiver is configured to transmit a configuration of $N_{cells}^{DL,j}$ DL cells,
scheduling on the $N_{cells}^{DL,j}$ DL cells is by corresponding PDCCH receptions having a sub-carrier spacing (SCS) value of $2^j \cdot 15$ kHz, j=0, . . . J, where J is a predetermined number of SCS values, and
the maximum number of PDCCH candidates and a maximum number of non-overlapped CCEs are determined to $M_{PDCCH}^{total,X,\mu} = \lfloor N_{cells}^{cap} \cdot M_{PDCCH}^{max,X,\mu} \cdot N_{cells}^{DL,X,\mu} / \Sigma_{j=0}^{J} N_{cells}^{DL,j} \rfloor$ and $C_{PDCCH}^{total,X,\mu} = \lfloor N_{cells}^{cap} \cdot C_{PDCCH}^{max,X,\mu} \cdot N_{cells}^{DL,X,\mu} / \Sigma_{j=0}^{J} N_{cells}^{DL,j} \rfloor$ respectively,
where:
$N_{cells}^{cap}$ is a number of DL cells configured to or indicated by the UE,
$M_{PDCCH}^{max,X,\mu}$ and $C_{PDCCH}^{max,X,\mu}$ are respectively a maximum number of PDCCH candidates and a maximum number of non-overlapped CCEs that the UE can monitor for a span gap of X symbols for subcarrier spacing (SCS) configuration $\mu$,
$N_{cells}^{DL,X,\mu}$ is a number of cells from $N_{cells}^{DL,\mu}$ DL cells where the UE monitors PDCCH according to a span gap of X symbols, and
$\lfloor \ \rfloor$ is a 'floor' function that rounds a number to a next smaller integer.

12. A method for receiving physical downlink control channels (PDCCHs) by a user equipment (UE), the method comprising:
transmitting capability information for physical downlink control channel (PDCCH) receptions on a downlink (DL) cell according to at least two (X,Y) combinations, wherein the PDCCH receptions are in any symbols of a span, a length of a span is up to Y symbols in a slot, and a number of symbols between first symbols of two consecutive spans is X;
receiving configuration information of one or more search space sets for the PDCCH receptions on the DL cell; and
in case that the UE indicates a capability to monitor at least one PDCCH according to the at least two combinations and the UE is configured the one or more search space sets with first symbols of consecutive spans separated by at least a value of X for one or more of the at least two combinations, determining to monitor the at least one PDCCH according to a combination with a largest value of X from the one or more combinations, wherein a larger maximum number of PDCCH candidates is associated with a larger value of X; and
receiving the at least one PDCCH on the DL cell based on the configuration information.

13. The method of claim 12, further comprising, in case that the UE indicates the capability to monitor the at least one PDCCH according to the at least two combinations and the UE is configured the one or more search space sets with first symbols of consecutive spans separated by at least the larger value of X for the at least two combinations, determining to monitor the at least one PDCCH according to a first combination with the larger value of X for the at least two combinations.

14. The method of claim 12, further comprising, in case that the UE indicates the capability to monitor the at least one PDCCH according to the at least two combinations and the UE is configured the one or more search space sets with first symbols of consecutive spans separated by at least a smaller value of X for the at least two combinations, determining to monitor the at least one PDCCH according to a second combination with the smaller value of X for the at least two combinations.

15. The method of claim 12, wherein determining to monitor the at least one PDCCH further comprises determining to monitor the at least one PDCCH according to the combination that is associated with the larger maximum number of PDCCH candidates and a larger maximum number of non-overlapping control channel elements (CCEs) per span.

16. The method of claim 12, further comprising:
receiving a configuration of $N_{cells}^{DL,j}$ DL cells, wherein scheduling on the $N_{cells}^{DL,j}$ DL cells is by corresponding PDCCH receptions having a sub-carrier spacing (SCS) value of $2^j \cdot 15$ kHz, j=0, . . . J, where J is a predetermined number of SCS values; and
determining the maximum number of PDCCH candidates and a maximum number of non-overlapped CCEs to $M_{PDCCH}^{total,X,\mu} = \lfloor N_{cells}^{cap} \cdot M_{PDCCH}^{max,X,\mu} \cdot N_{cells}^{DL,X,\mu} / \Sigma_{j=0}^{J} N_{cells}^{DL,j} \rfloor$ and $C_{PDCCH}^{total,X,\mu} = \lfloor N_{cells}^{cap} \cdot C_{PDCCH}^{max,X,\mu} \cdot N_{cells}^{DL,X,\mu} / \Sigma_{j=0}^{J} N_{cells}^{DL,j} \rfloor$ respectively,
where:
$N_{cells}^{cap}$ is a number of DL cells configured to or indicated by the UE,
$M_{PDCCH}^{max,X,\mu}$ and $C_{PDCCH}^{max,X,\mu}$ are respectively a maximum number of PDCCH candidates and a maximum number of non-overlapped CCEs that the UE can monitor for a span gap of X symbols for subcarrier spacing (SCS) configuration $\mu$,
$N_{cells}^{DL,X,\mu}$ is a number of cells from $N_{cells}^{DL,\mu}$ DL cells where the UE monitors PDCCH according to a span gap of X symbols, and
$\lfloor \ \rfloor$ is a 'floor' function that rounds a number to a next smaller integer.

17. The method of claim 12, further comprising:
receiving PDCCHs on the DL cell according to the search space sets;
receiving a configuration of second search space sets for PDCCH receptions on a second DL cell;
receiving PDCCHs on the second DL cell according to the second search space sets;
receiving first and second physical downlink shared channels (PDSCHs) on the DL cell, the first and second PDSCHs providing first and second transport blocks (TBs), respectively, wherein the first PDSCH is scheduled by a first downlink control information (DCI) format provided by a PDCCH reception on the DL cell, the first DCI format includes a carrier indicator field (CIF) with a value 0, the second PDSCH is scheduled by a second DCI format provided by a PDCCH reception on the second DL cell, and the second DCI format includes a CIF with a value other than 0;
transmitting, on a first cell, a physical uplink control channel (PUCCH) with hybrid automatic repeat request acknowledgement (HARQ-ACK) information for the first TB; and
transmitting, on a second cell, a PUCCH with HARQ-ACK information for the second TB, wherein the first and second DCI formats include a field indicating a cell for a PUCCH transmission.

18. A method for transmitting physical downlink control channels (PDCCHs) by a base station, the method comprising:
receiving, from a user equipment (UE), capability information for physical downlink control channel (PDCCH) receptions on a downlink (DL) cell according to at least two (X,Y) combinations, wherein the PDCCH receptions are in any symbols of a span, a length of a span is up to Y symbols in a slot, and a number of symbols between first symbols of two consecutive spans is X;

transmitting configuration information of one or more search space sets for the PDCCH receptions on the DL cell; and transmitting, to the UE, at least one PDCCH on the DL cell based on the configuration information, wherein, in case that the UE indicates a capability to monitor the at least one PDCCH according to the at least two combinations and the UE is configured the one or more search space sets with first symbols of consecutive spans separated by at least a value of X for one or more of the at least two combinations, a combination to be used for PDCCH monitoring is determined as one with a largest value of X from the one or more combinations, and wherein a larger maximum number of PDCCH candidates is associated with a larger value of X.

19. The method of claim 18, wherein, in case that the UE indicates the capability to monitor the at least one PDCCH according to the at least two combinations and the UE is configured the one or more search space sets with first symbols of consecutive spans separated by at least the larger value of X for the at least two combinations, the combination to be used for PDCCH monitoring is determined as a first combination with the larger value of X for the at least two combinations.

20. The method of claim 18, wherein, in case that the UE indicates the capability to monitor the at least one PDCCH according to the at least two combinations and the UE is configured the one or more search space sets with first symbols of consecutive spans separated by at least a smaller value of X for the at least two combinations, the combination to be used for PDCCH monitoring is determined as a second combination with the smaller value of X for the at least two combinations.

* * * * *